No. 666,639. Patented Jan. 29, 1901.
J. BIRD.
BARREL HOOPING AND HEADING MACHINE.
(Application filed Dec. 6, 1899.)
(No Model.) 14 Sheets—Sheet 1.

No. 666,639. Patented Jan. 29, 1901.
J. BIRD.
BARREL HOOPING AND HEADING MACHINE.
(Application filed Dec. 6, 1899.)
(No Model.) 14 Sheets—Sheet 2.
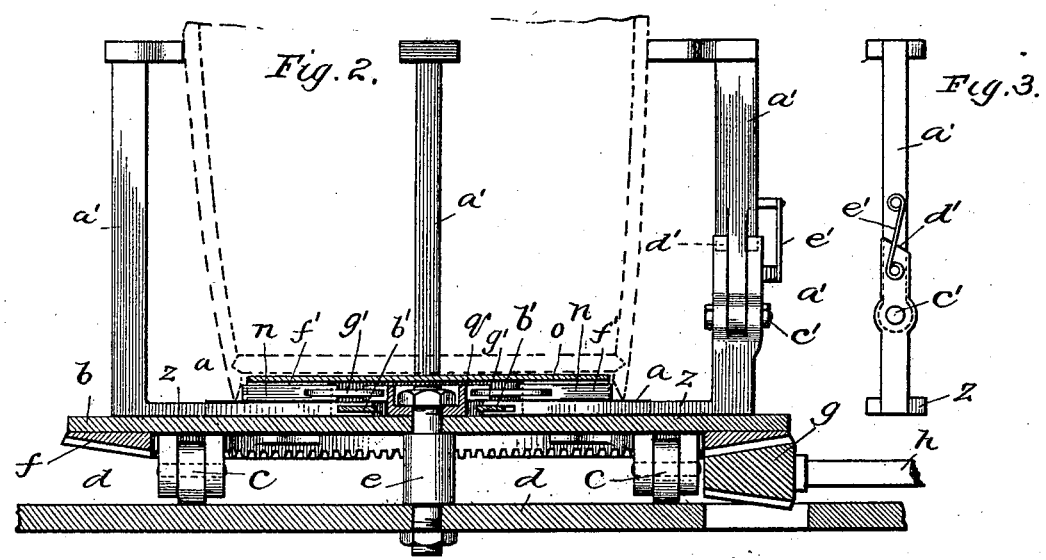
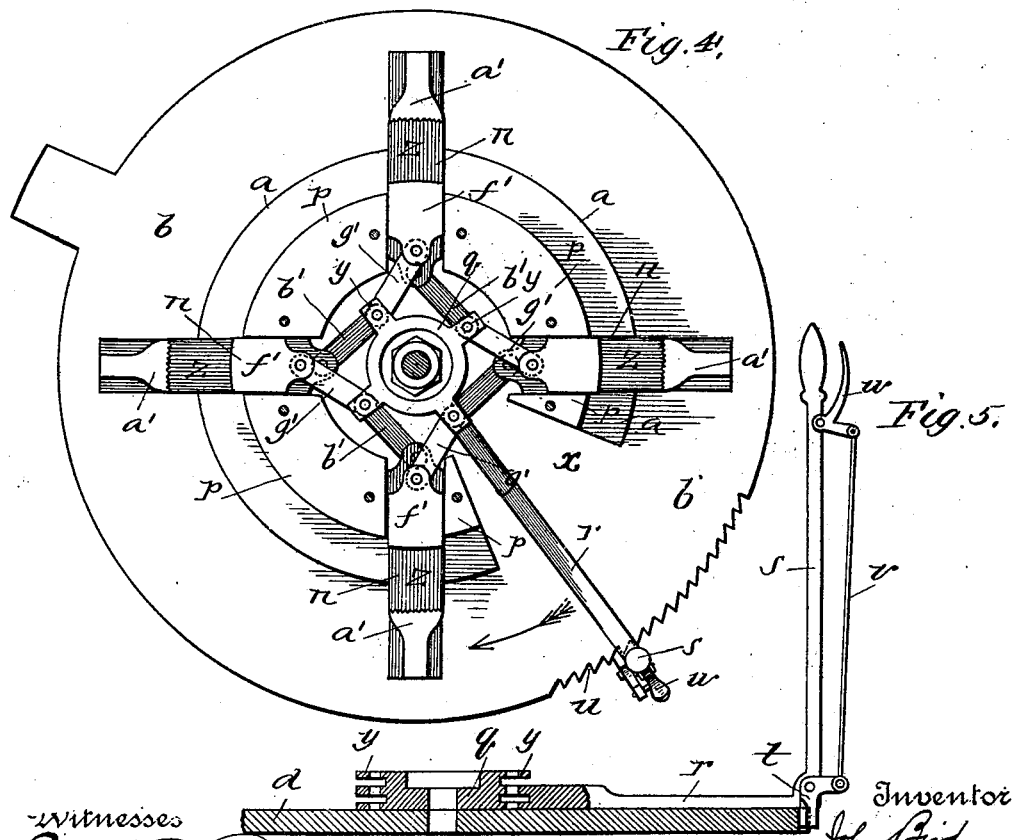

No. 666,639. Patented Jan. 29, 1901.
J. BIRD.
BARREL HOOPING AND HEADING MACHINE.
(Application filed Dec. 6, 1899.)
(No Model.) 14 Sheets—Sheet 3.
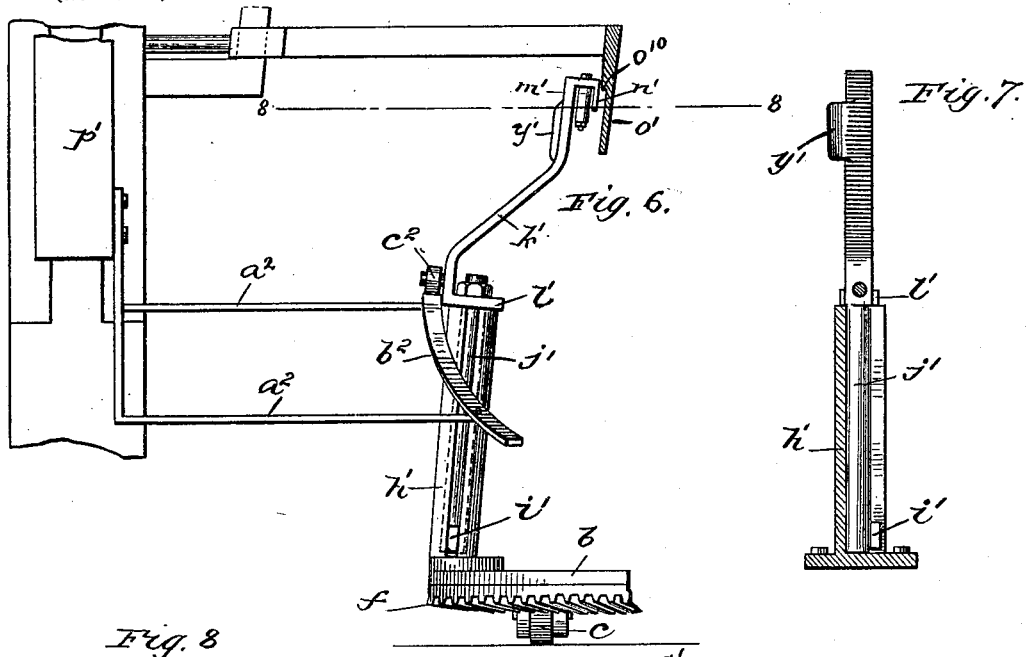
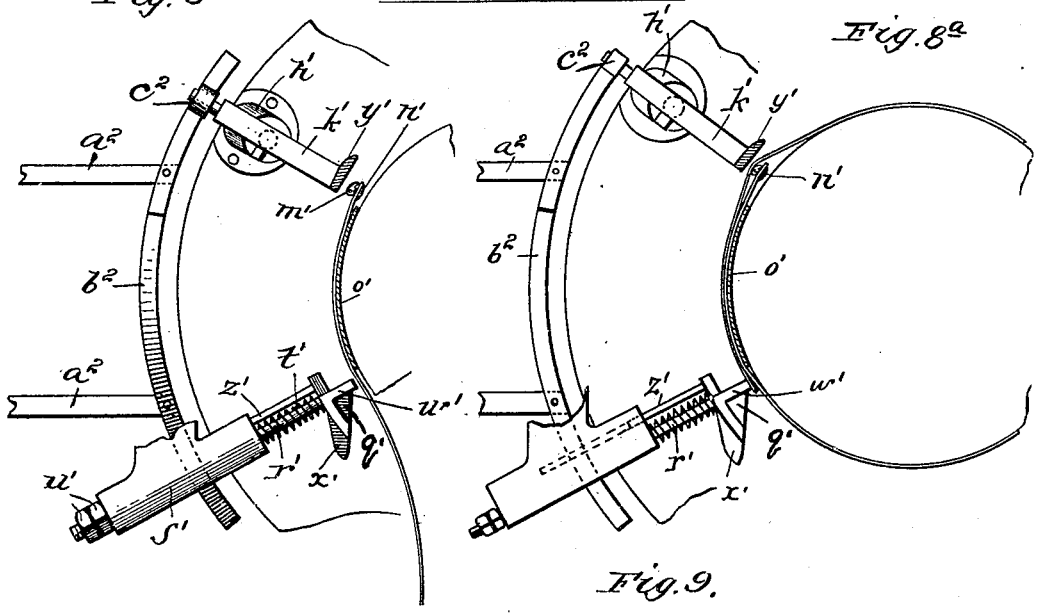
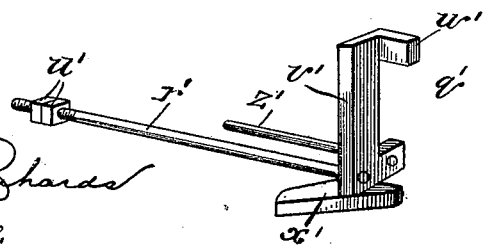
Witnesses
George D. Richards
G. H. Walmsley
Inventor
John Bird
By Davis & Davis
Attorneys

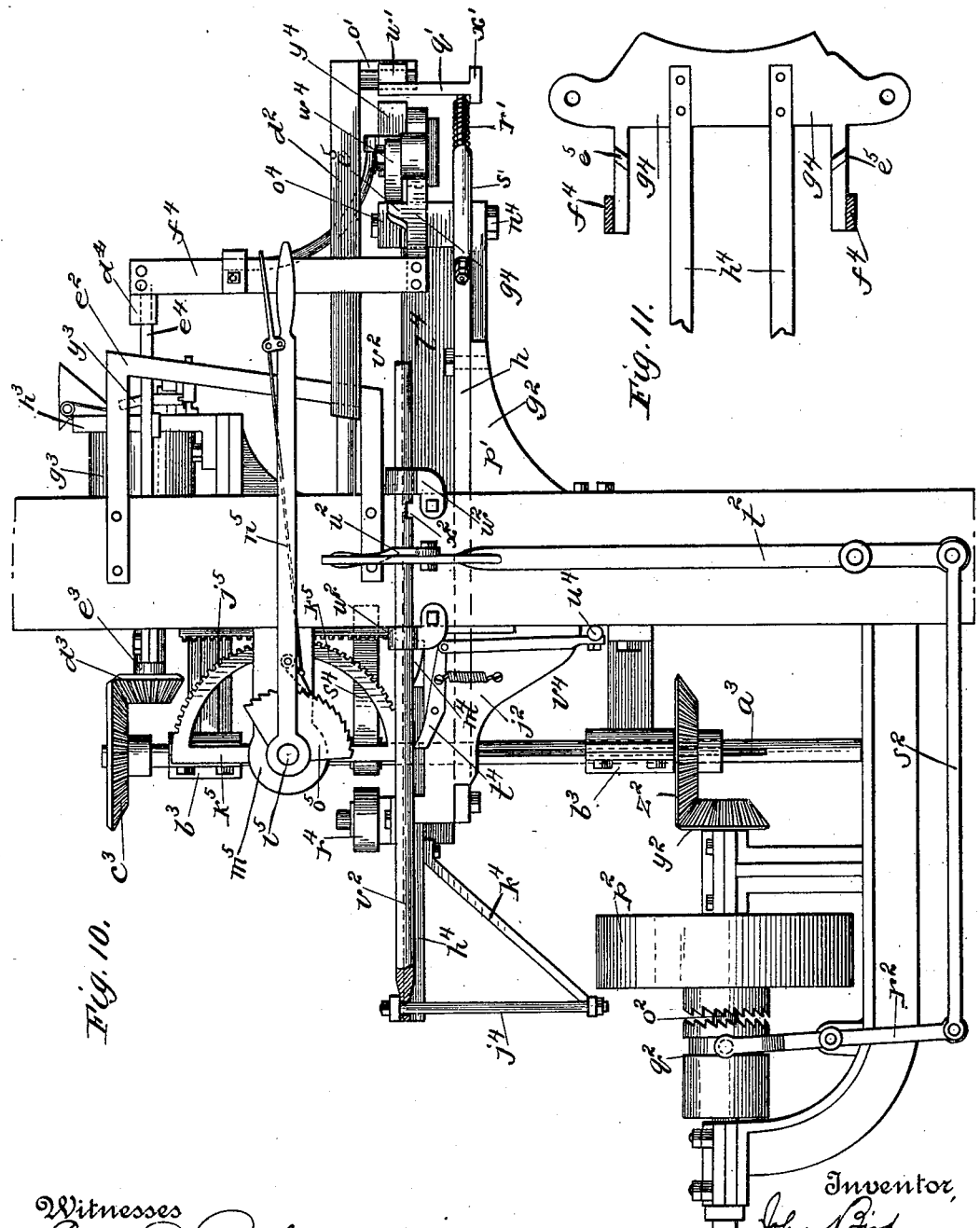

No. 666,639. Patented Jan. 29, 1901.
J. BIRD.
BARREL HOOPING AND HEADING MACHINE.
(Application filed Dec. 6, 1899.)
(No Model.) 14 Sheets—Sheet 5.
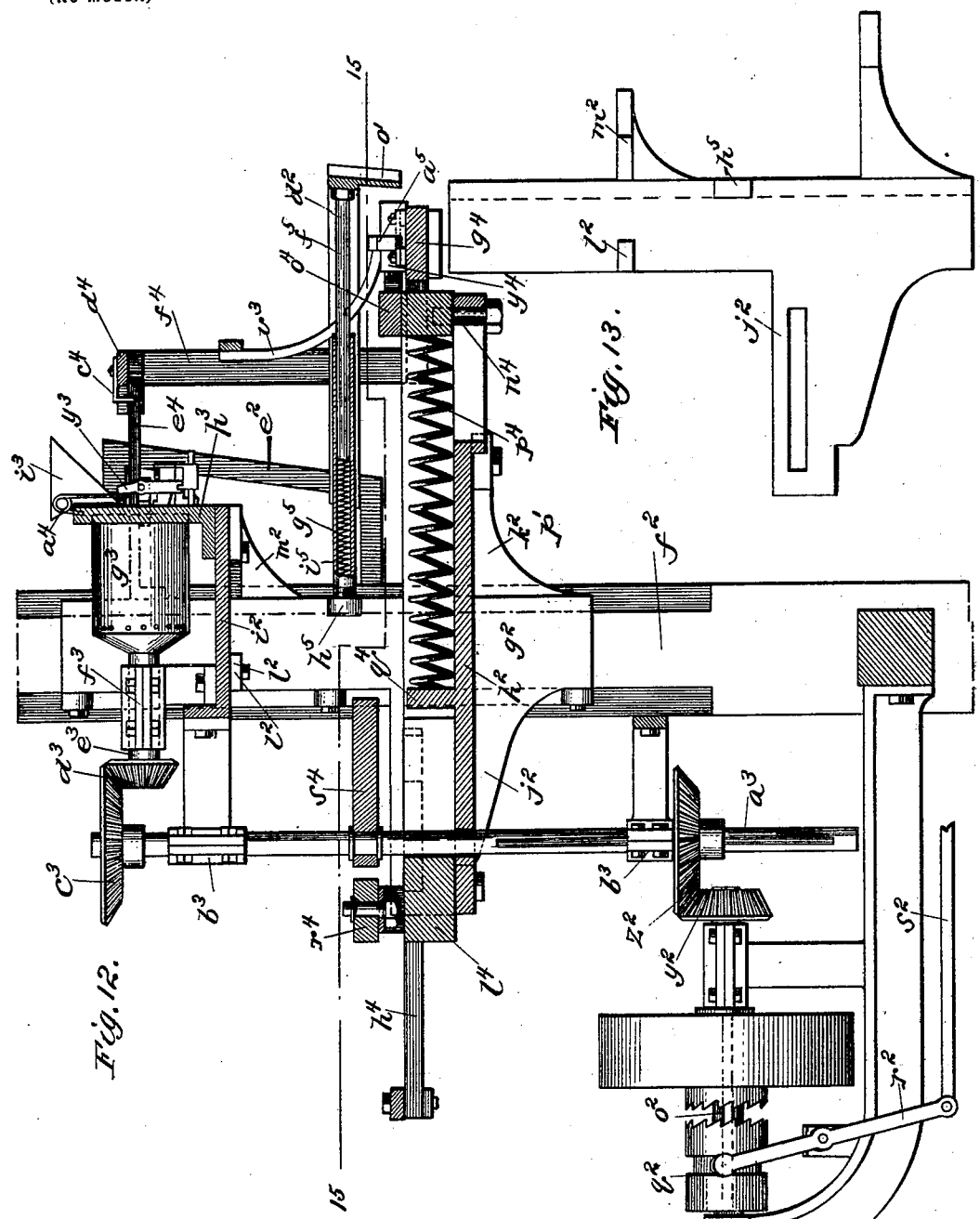

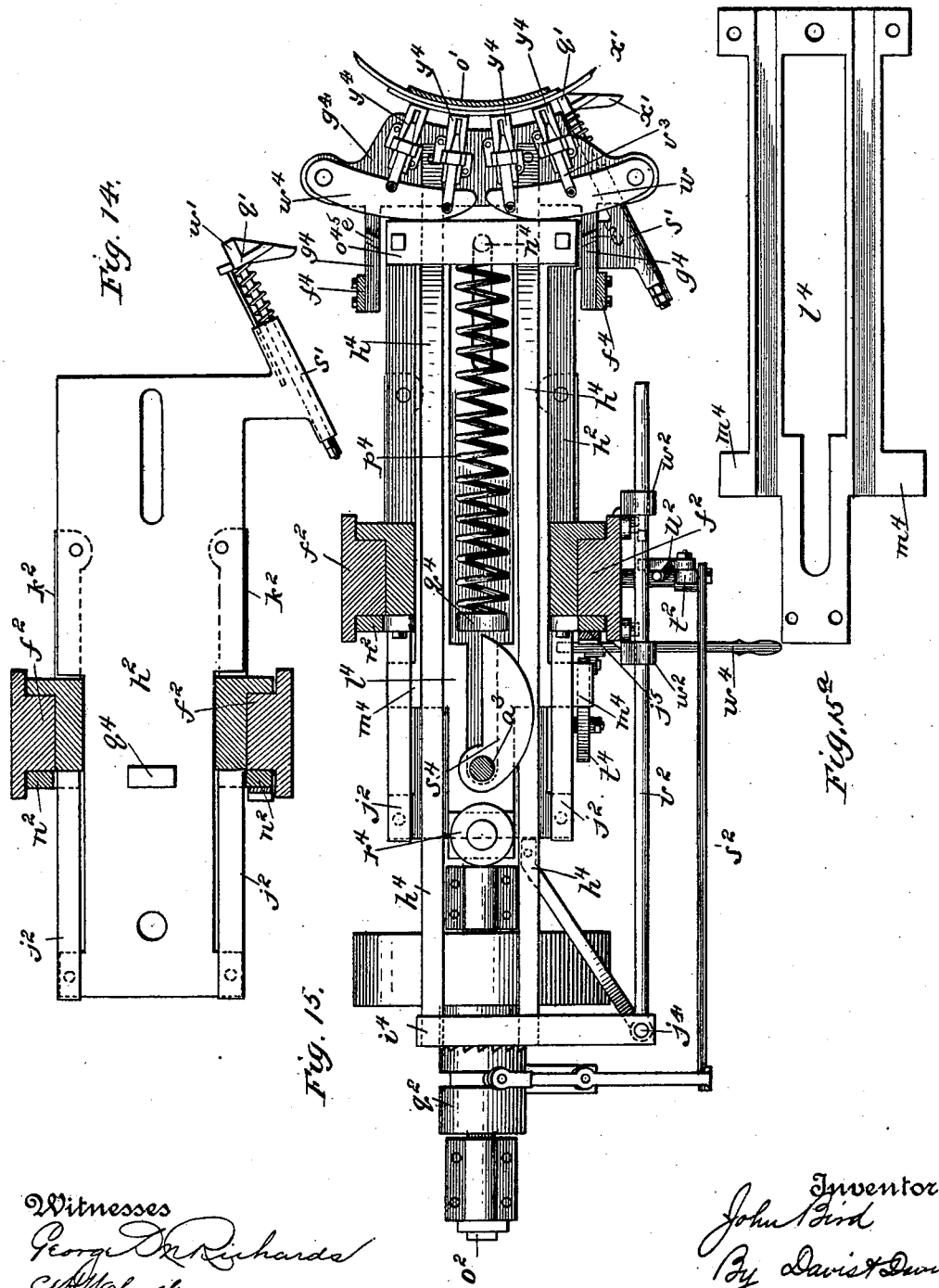

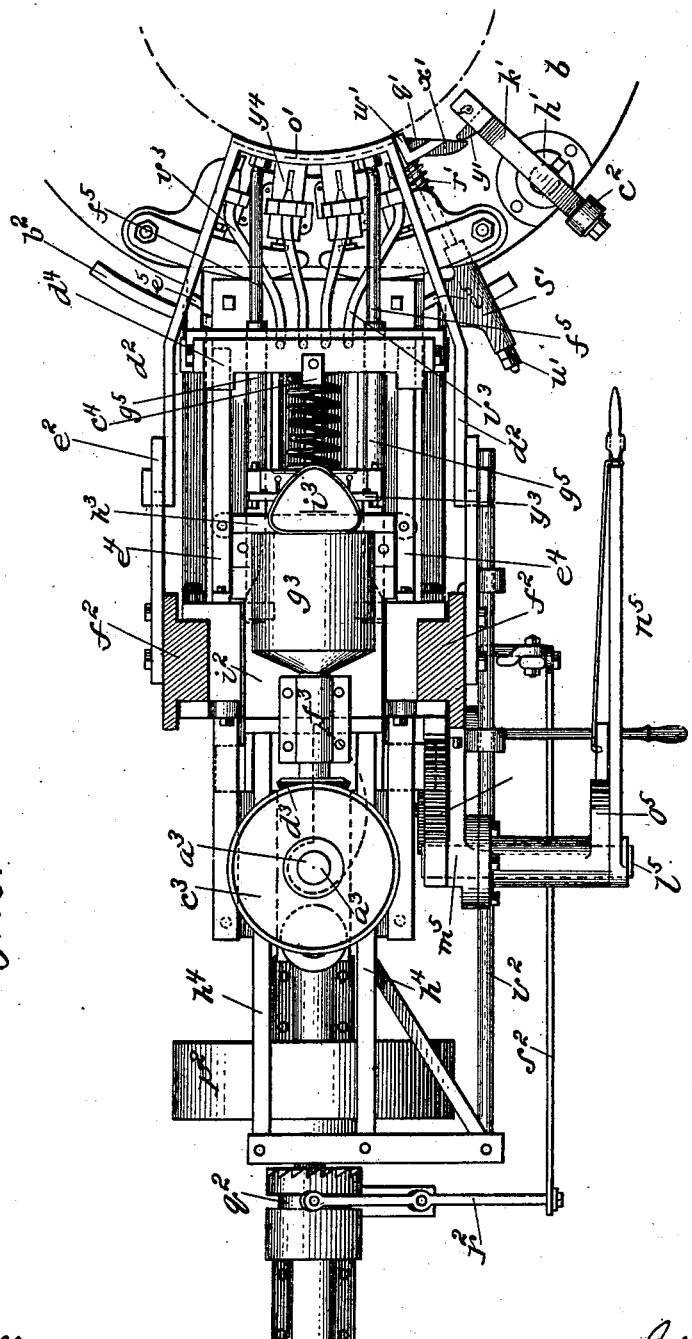

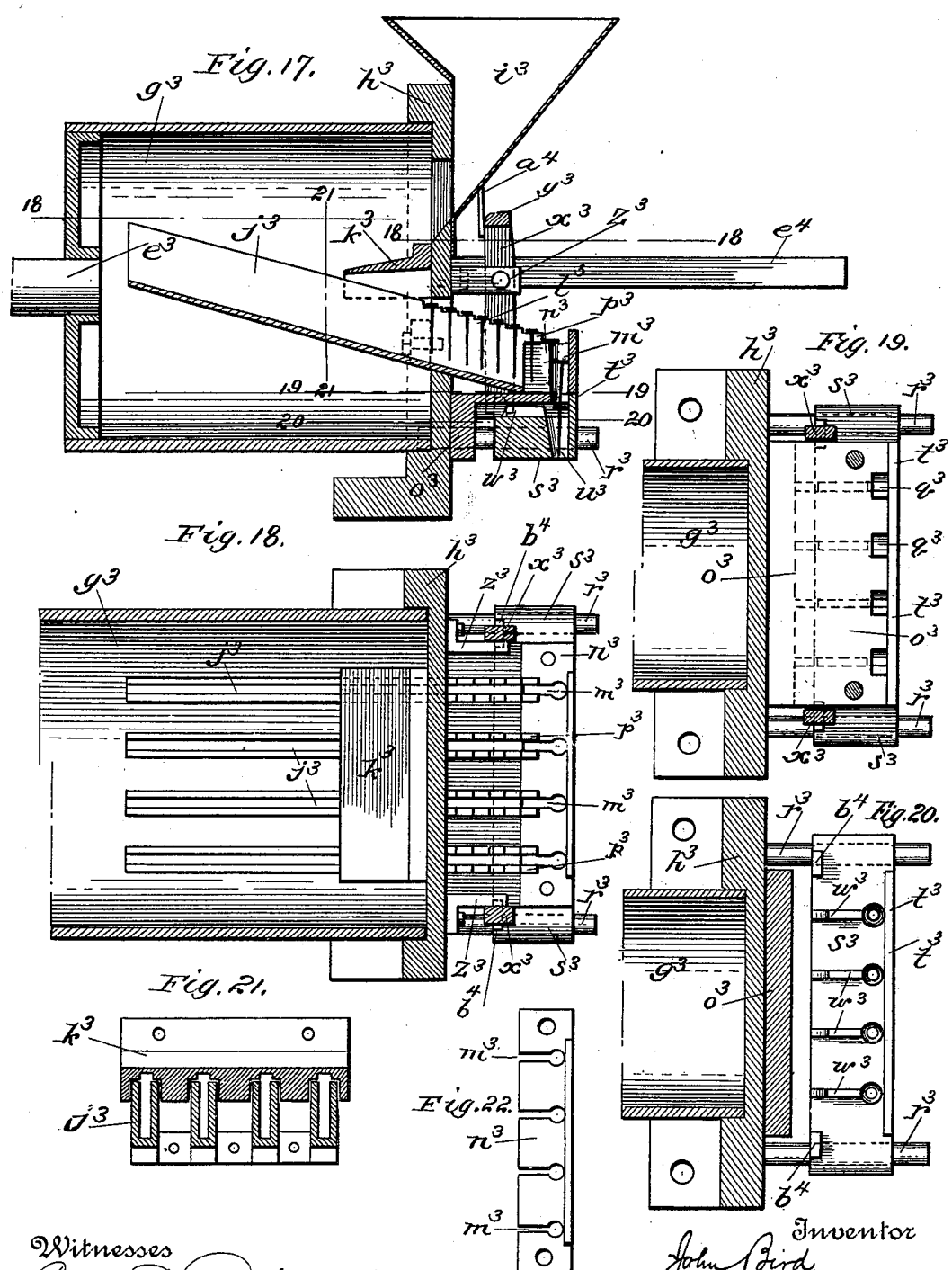

No. 666,639. Patented Jan. 29, 1901.
J. BIRD.
BARREL HOOPING AND HEADING MACHINE.
(Application filed Dec. 6, 1899.)
(No Model.) 14 Sheets—Sheet 9.
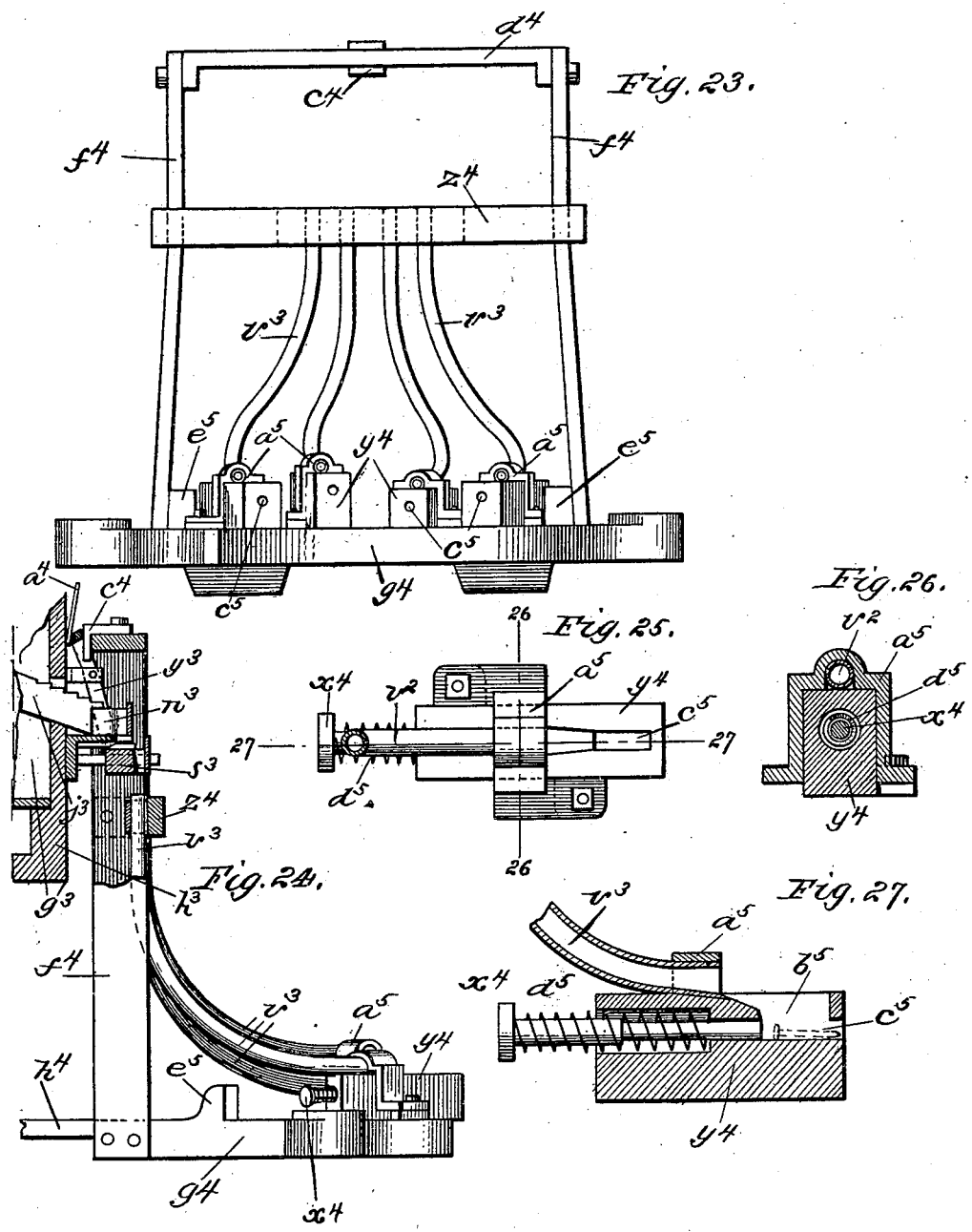
Witnesses
George D. Richards
G. H. Walmsley
Inventor
John Bird
By Davis & Davis
Attorneys

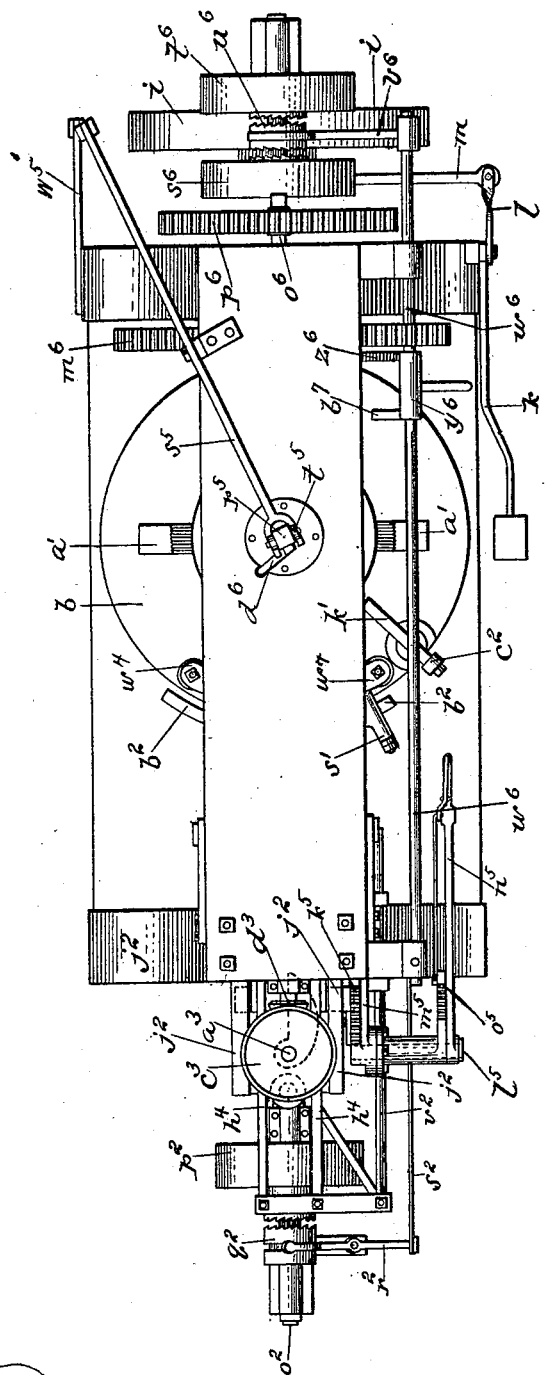

No. 666,639. Patented Jan. 29, 1901.
J. BIRD.
BARREL HOOPING AND HEADING MACHINE.
(Application filed Dec. 6, 1899.)
(No Model.) 14 Sheets—Sheet 11.
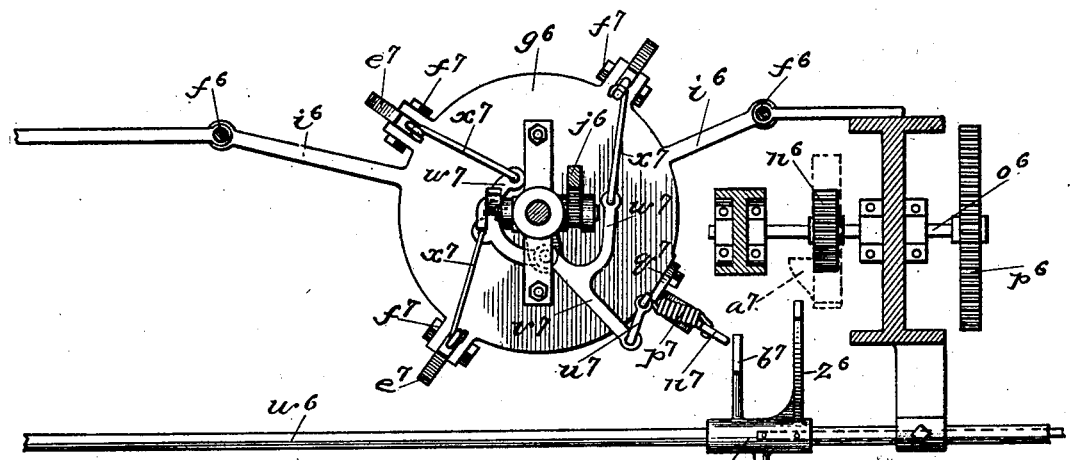
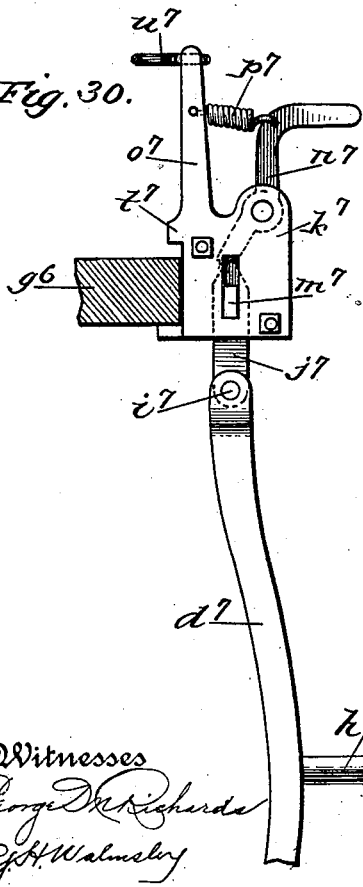
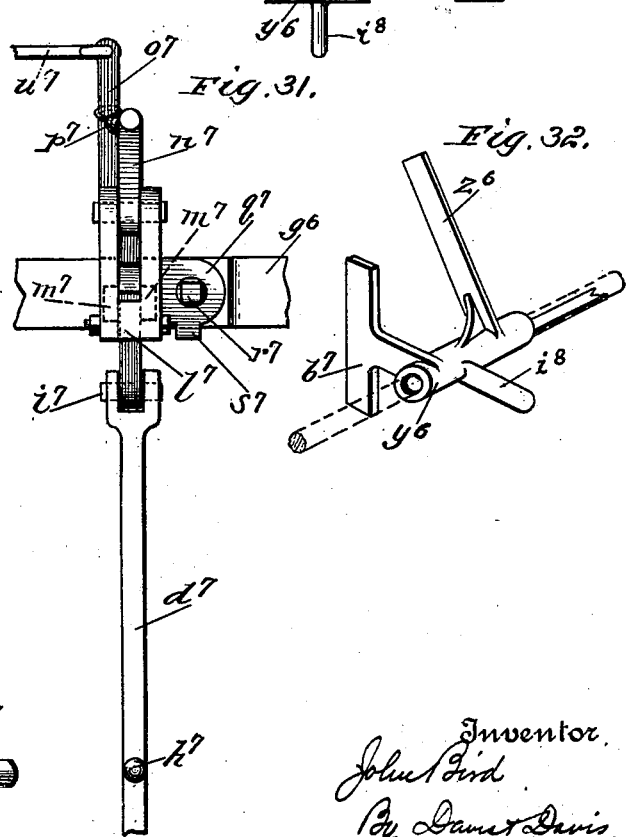

No. 666,639. Patented Jan. 29, 1901.
J. BIRD.
BARREL HOOPING AND HEADING MACHINE.
(Application filed Dec. 6, 1899.)
(No Model.) 14 Sheets—Sheet 12.

Witnesses
George M. Richards
G. H. Walmsley

Inventor
John Bird,
By Davis & Davis,
Attorneys.

No. 666,639. Patented Jan. 29, 1901.
J. BIRD.
BARREL HOOPING AND HEADING MACHINE.
(Application filed Dec. 6, 1899.)
(No Model.) 14 Sheets—Sheet 13.
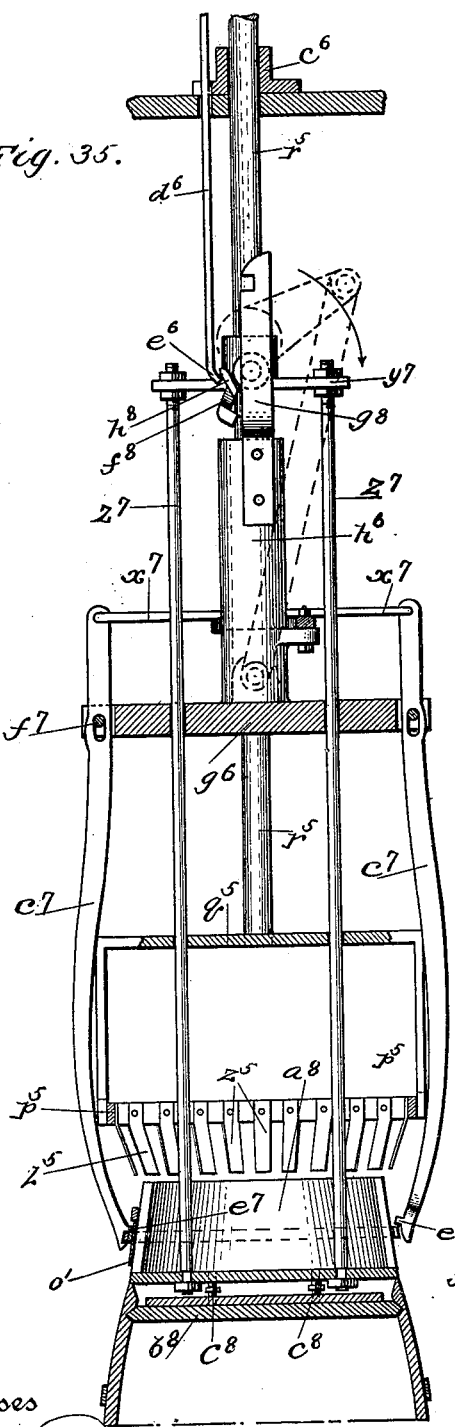
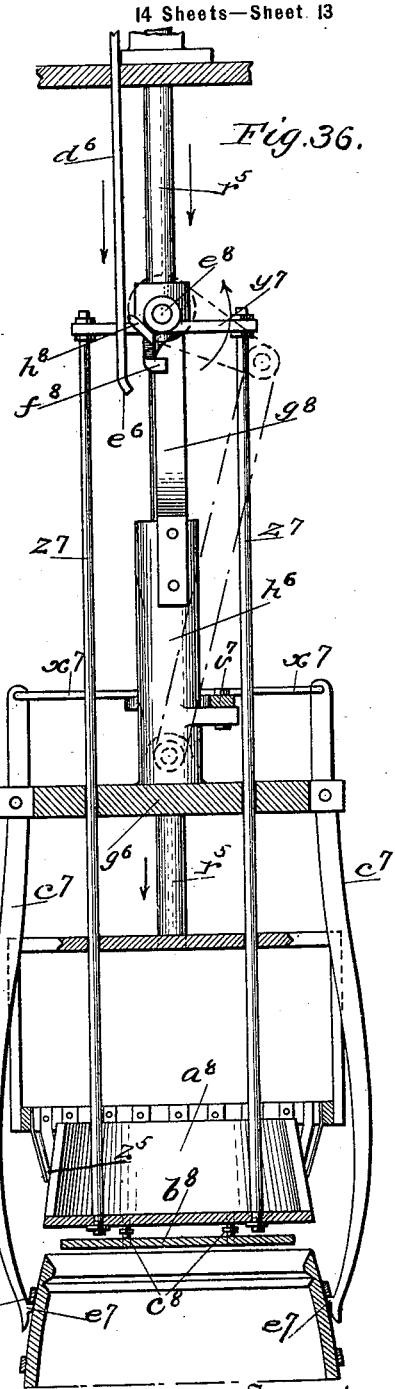

No. 666,639. Patented Jan. 29, 1901.
J. BIRD.
BARREL HOOPING AND HEADING MACHINE.
(Application filed Dec. 6, 1899.)
(No Model.) 14 Sheets—Sheet 14.
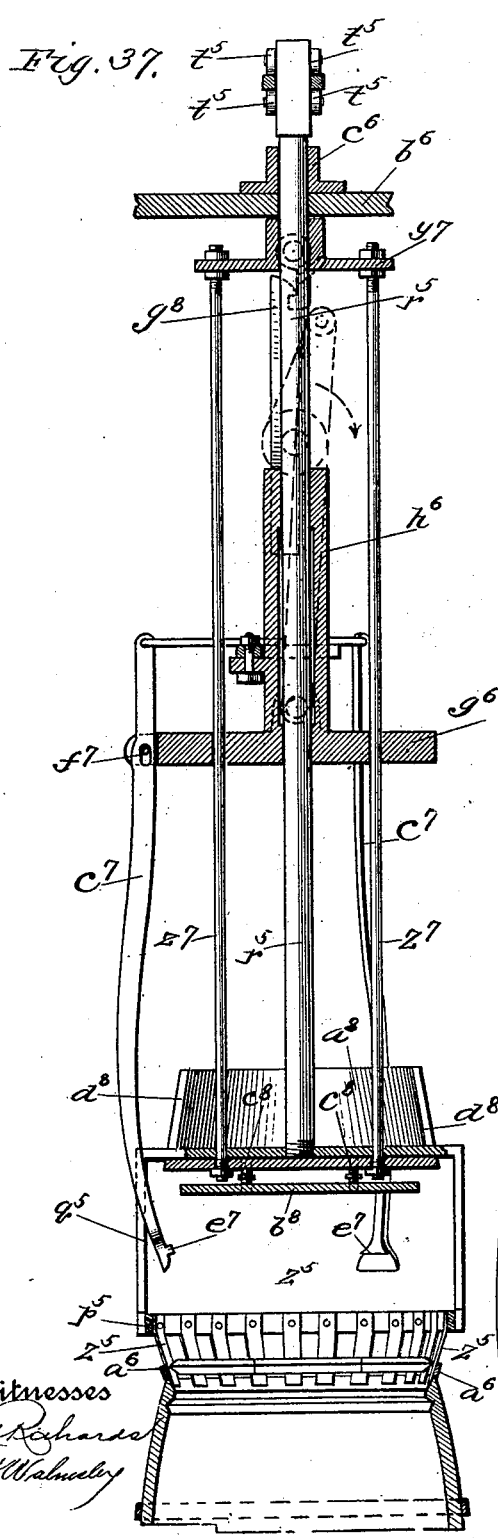
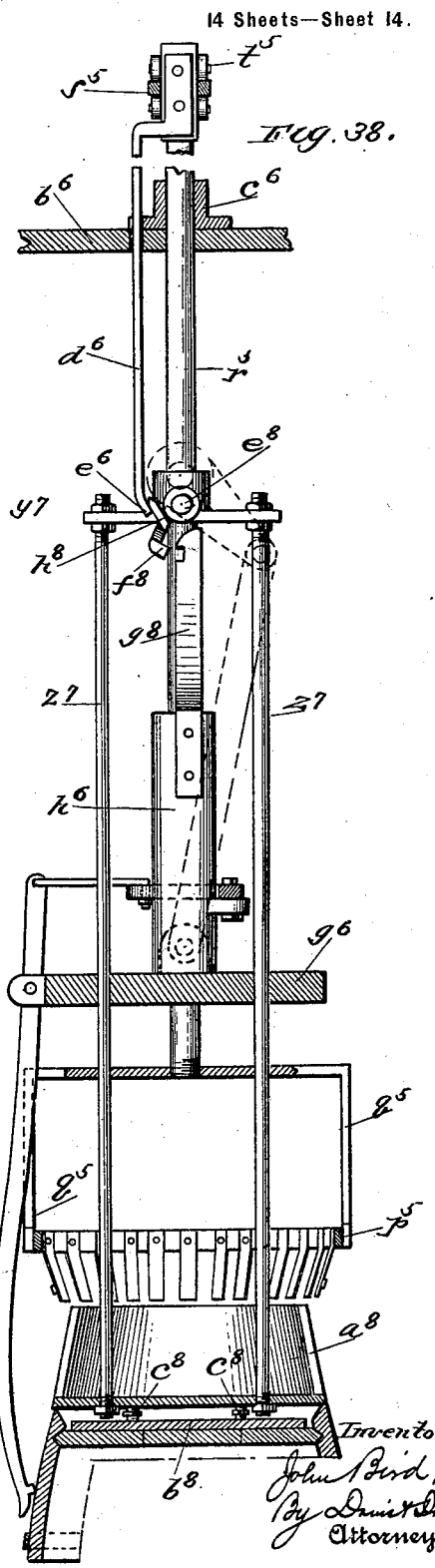

UNITED STATES PATENT OFFICE.

JOHN BIRD, OF ROCKLAND, MAINE.

BARREL HOOPING AND HEADING MACHINE.

SPECIFICATION forming part of Letters Patent No. 666,639, dated January 29, 1901.

Application filed December 6, 1899. Serial No. 739,369. (No model.)

*To all whom it may concern:*

Be it known that I, JOHN BIRD, a citizen of the United States, and a resident of Rockland, county of Knox, State of Maine, have invented certain new and useful Improvements in Barrel Hooping and Heading Machines, of which the following is a specification, reference being had therein to the accompanying drawings, in which—

Figure 1:
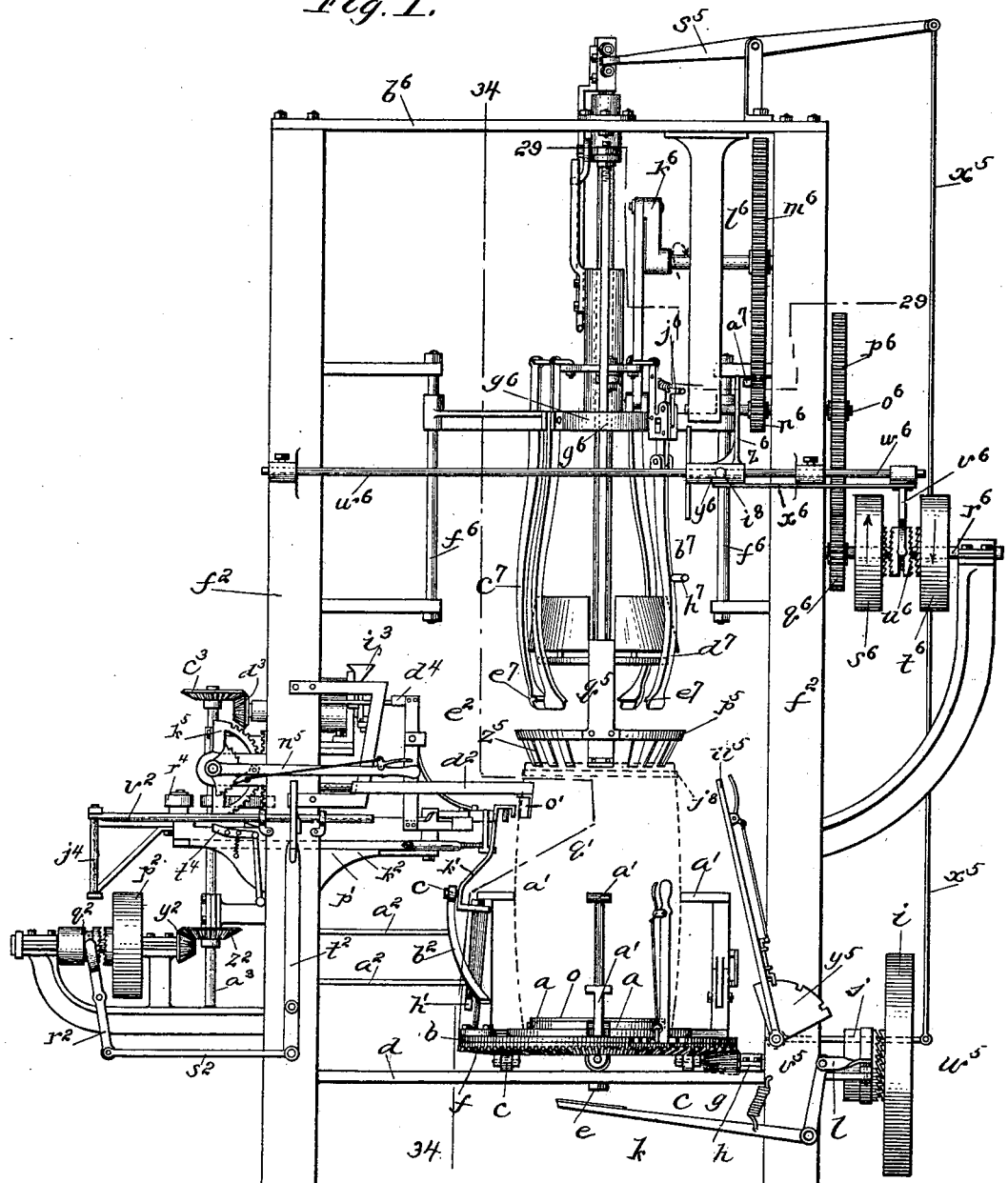
Figure 33:
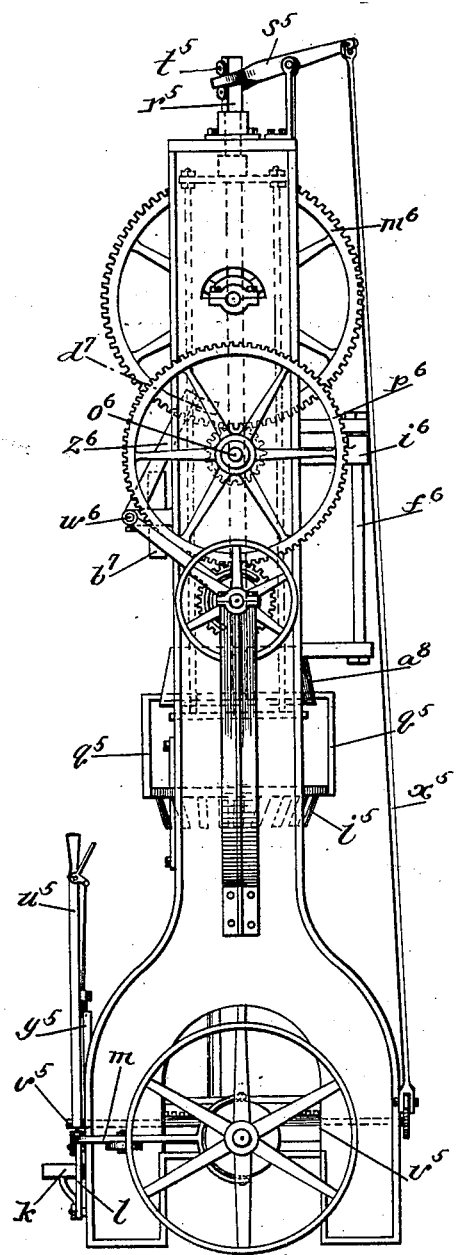
Figure 34:
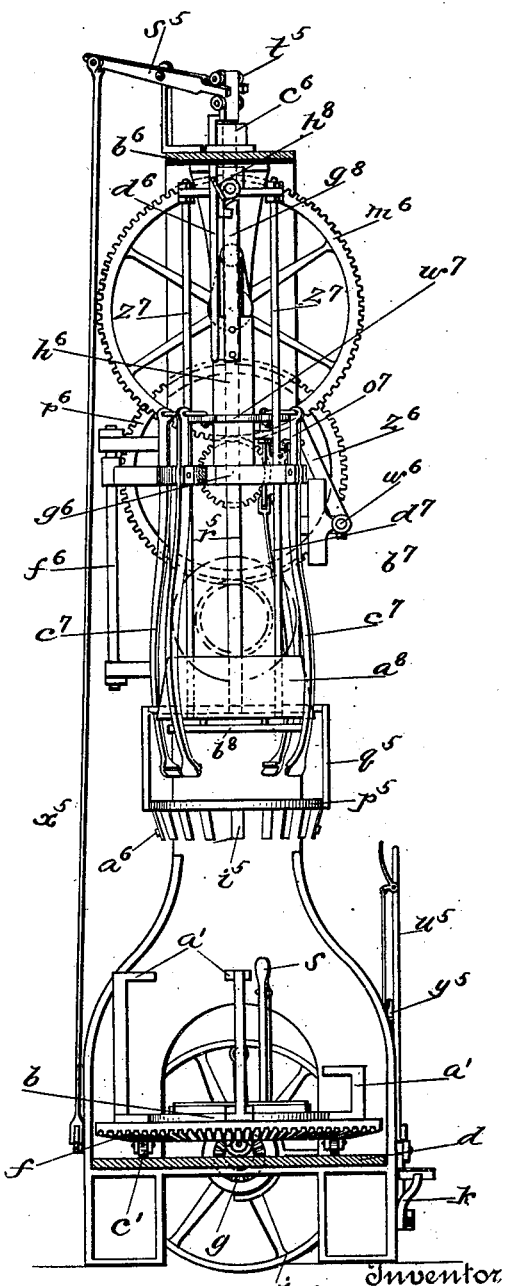

Figure 1 is a side elevation of my machine complete; Fig. 2, a detail vertical section of the barrel supporting and rotating devices; Fig. 3, a detail side elevation of one of the outer clamps; Fig. 4, a detail plan view showing the mechanism for operating the clamps; Fig. 5, a detail vertical section through a portion of the turn-table, showing the lever for operating the clamps; Fig. 6, a detail side elevation of the hoop-carrier, the clencher-plate $o'$ being shown in vertical section and the adjacent parts of the frame, the nailer-carriage $p'$, and the turn-table being shown; Fig. 7, a detail view, partly in section, of the hoop-carrier; Fig. 8, a plan view, partly in section, of the device shown in Fig. 6, the parts being in the position they occupy in beginning the operation of winding a hoop; Fig. 8$^a$, a plan view, partly in section, of the devices shown in Fig. 6, the hoop being completely wound and overlapped on the clencher-plate and the hoop-presser $q'$ being shown; Fig. 9, a detail perspective view of the hoop-presser; Fig. 10, a side elevation of the nailer mechanism; Fig. 11, a detail plan, partly in section, of the carriage carrying the nail-holding devices; Fig. 12, a vertical section view of the nailing mechanism; Fig. 13, a detail view of the inner face of one of the side plates of the nailer-carriage; Fig. 14, a plan view of the base-plate of the carriage, the side plates and the supporting-posts being shown in section; Fig. 15, a horizontal section on the line 15 15 of Fig. 12; Fig. 15$^a$, a detail plan view of the hammer; Fig. 16, a plan view of the nailer mechanism, the adjacent parts of the hoop-winding mechanism being shown; Fig. 17, a vertical sectional view of the nail feeding and delivery devices; Fig. 18, a horizontal section taken on the line 18 18 of Fig. 17; Fig. 19, a horizontal section taken on the line 19 19 of Fig. 17; Fig. 20, a horizontal section taken on the line 20 20 of Fig. 17; Fig. 21, a detail section on the line 21 21 of Fig. 17; Fig. 22, a detail plan of one of the parts (block $n^3$) of the nail-feeding devices; Fig. 23, a detail front elevation of the supplemental carriage carrying the nail-holding and nail-driving pins; Fig. 24, a side elevation of the same, partly in section, showing the adjacent parts of the nail-feeding and nail-delivering devices; Figs. 25, 26, and 27, detail views of one of the nail-holding blocks and driving-pins; Fig. 28, a plan view of the complete machine; Fig. 29, a transverse section taken as nearly as possible on the zigzag line 29 of Fig. 1; Fig. 30, a detail side elevation, and Fig. 31 a detail of the edge elevation, of one of the hoop-drivers; Fig. 32, a detail perspective view of a part of the clutch-shifting mechanism; Fig. 33, a side elevation of the machine complete; Fig. 34, a vertical section taken as nearly as possible on the line 34 of Fig. 1; Figs. 35, 36, 37, and 38, vertical sectional views, partly in side elevation, showing the various movements and positions of the hoop driving and removing devices and head-setting devices.

This machine is designed for hooping and heading that class of barrels known to the trade as "slack-barrels;" and it is adapted to receive the barrel after it leaves the crozing-machine, the croze and chamfer being cut in each end of the barrel and each end of the barrel being provided with a temporary or "truss" iron hoop.

The machine is designed to perform the following operations in the order named: first, support and clamp the barrel in a vertical position and rotate it on its vertical axis and simultaneously wind the hoops thereon, the ends of the hoops being overlapped in position to be nailed, the hoop on the bilge of the barrel being first applied and then the hoops at the end of the barrel; second, nail the overlapped ends of the hoops together, the nails being clenched on the inner side of the hoop, so that the hoop loosely surrounds the barrel; third, drive or jam the hoops down upon the barrel and remove the truss-hoop; fourth, insert the barrel-head, after which the end hoops are put on and nailed the same as with bilge-hoop. One end of the barrel is hooped and headed at a time, the barrel being then taken out and turned over to have its opposite end worked, as more fully hereinafter set forth.

The above mechanisms will be described in the order given:

*Barrel-support and hoop-winder.*—The barrel when in place rests endwise upon a series of segmental plates $a$, bolted to a turn-table $b$, supported by casters $c$ upon a base-plate $d$ and rotating upon a central bolt $e$, supported on said base-plate. This table is rotated by means of a beveled gear $f$, secured to its under side and meshing with a bevel-pinion $g$ on a drive-shaft $h$, carrying a band-wheel $i$ and a clutch $j$ on its outer end, said clutch being controlled by a spring-actuated foot-lever $k$ and connecting-rods $l\ m$, whereby the operator may at will cause the table to rotate by depressing the foot-lever, and thereby engaging the clutch.

The segments $a$ are separated, so as to provide radial grooves $n$, and these grooves and the central space between the inner ends of the segments are covered over by a plate $o$, circular in shape and of a diameter adapted to fit within the end of the barrel, the segments being provided with upward projections or enlargements $p$, so as to bring said plate slightly up into the barrel. The end of the barrel therefore surrounds the plate $o$ and said projections and rests upon the segments outside of said projections.

Rotatingly mounted upon the upper end of the central bolt $e$ between the table $b$ and plate $o$ and the inner ends of the segments is a ring $q$, which is recessed centrally to receive the nut on the upper end of said bolt. Connected to said ring is a radial arm $r$, which extends out to the edge of the table and then upward to a handle $s$, by means of which the ring $q$ may be partially rotated, said lever being provided with a pawl $t$ at its lower end in order that it may be locked in its adjusted position, said pawl being adapted to gravitatingly engage ratchet-teeth $u$ on the adjacent edge of the turn-table and to be withdrawn from said teeth by means of a suitable rod $v$ and grip-lever $w$. One of the segments $a$ is divided radially to form a space $x$ for said bar $r$ to work in.

The ring $q$ is provided with four equidistant radial lugs $y$, which are located at points between the radial grooves $n$. In the bottoms of the grooves $n$ slide the inward-extending arms $z$ of the outer clamps $a'$, the inner ends of these arms $z$ being pivotally connected to lugs $y$ by means of links $b'$, one bar being connected to each of the lugs, whereby the rotation or oscillation of ring $q$ will push out or draw in the clamps, according as the ring is moved in one direction or the other. The vertical branches of these outer clamps rise to near the middle of the barrel and are provided with inward-extending ends to firmly grasp the barrel at that point. One of the uprights of these clamps is made considerably shorter than the others, as shown in Fig. 1, and one of the uprights adjacent this shorter clamp is jointed, so that it may swing down in a direction tangential to the turn-table, this joint being formed by bifurcating the lower section of the standard and pivotally securing therein the lower flattened end of the upper section by means of horizontal bolt $c'$, which is radial with respect to the circular turn-table. The upper section of the upright is shouldered at $d'$, and said shoulders are adapted to abut against shoulders on the upper ends of the bifurcated part of the lower section, both abutting faces of these shoulders being inclined, forming a sort of rule-joint, that serves to keep the parts of the two sections in vertical alinement. The upper section is held up normally by means of a spring $e'$, so that it will return to position when it is released after being turned down.

The inner clamps consist simply of plates or blocks $f'$, fitting in grooves $n$ and resting on bars $z$ and being pivotally connected at their inner ends to lugs $y$ by links $g'$, similar to links $b'$, but which extend in the opposite directions from said links $b'$, whereby when ring $q$ is turned the inner jaws $f'$ will slide in the opposite directions from the jaws $a'$. It will be observed that the bars $z$ of the outer clamps rest upon the turn-table and in turn support the inner clamps $f'$, both clamps fitting the grooves or spaces between the segments, so that they shall be guided radially.

To place the barrel, it is simply lifted high enough to pass over the shorter one of the clamp members $a'$, the upper section of the jointed member being pressed down to one side by the barrel itself. Thus this shorter clamp-arm and the jointed clamp-arm avoid the necessity of lifting the barrel to the height of the longer clamp-arms. The elevated plate $o$ covers the working parts of the clamps and assists in placing the barrel, and the barrel is clamped in place and centered by moving the operating-lever in the direction of the arrow shown in Fig. 4, this movement causing the inner clamps to engage the lower edge of the barrel at the chamfer and the outer clamp to grasp the barrel near its mid-length. The barrel is then ready to be rotated to wind the hoop around it.

The hoop-winder consists of a tubular socket $h'$, fastened rigidly to the turn-table at one edge and rising vertically therefrom and inclining slightly toward the barrel, this socket being slotted longitudinally to receive a lug $i'$, carried by a rod $j'$, working vertically in the socket and having clamped rigidly to its upper end an arm $k'$, the lower bent end $l'$ of this arm resting on the upper end of socket $h'$ and limiting the downward movement of the rod $j'$. The upper end of arm $k'$ is bent inward to near the barrel, its upper extremity terminating a little above that point below the upper end of the barrel where it is desired to apply the upper bilge-hoop. The upper end of this arm is provided with a suitable hoop-clamp, consisting in the present instance of a vertical pin carrying a toothed cam $m'$, said pin depending from the inward bent end of arm $k'$ and said cam being toothed on its inner face, this toothed face operating, in conjunction with a lip $n'$, depending from the said inward bent end of arm $k'$, to grasp the end of the hoop, the end of the hoop being inserted between the cam and the lip from below. Supported between this clamp and the barrel is a slightly-convexed clencher-plate $o'$, as hereinafter more fully described. Mounted on the carriage $p'$ of the nailer is a hoop-presser $q'$, which consists of a horizontal rod $r'$, working through a sleeve $s'$, secured to the nailer-carriage $p'$ and arranged radially with respect to the barrel-support, said rod being normally pressed inward toward the barrel by means of the coil-spring $t'$, the rod being restricted in its movement toward the barrel by means of nuts $u'$ on the outer end of the rod. The inner end of the rod carries a head-block $v'$, arranged vertically and provided at its upper end with a projection $w'$, which is adapted to bear upon the hoop and hold it close to the barrel while it is being wound thereon and nailed. The lower end of head $v'$ is provided with a cam-lug $x'$. This hoop-presser is supported in the circular path of the hoop-clamp, and in order that it may be pushed back out of the way to let the clamp pass the arm $k'$ is provided near its upper end with a cam-lip $y'$, which as the turn-table rotates strikes cam $x'$ and pushes back the hoop-presser and holds it out until the clamp carrying the end of the hoop has passed. The hoop-presser carries a rod $z'$, which is secured to the lower end of the head-block and extends outward parallel with rod $r'$ and works in a recess alongside the opening in which said rod $r'$ works, thereby serving to guide the hoop-presser in its movements.

To apply the hoop, the thin or lap end thereof—that is, the lapped part that is to lie next to the barrel—is inserted up between parts $m'$ and $n'$ and clamped therebetween, and the table is then rotated, the operator holding tightly to the hoop and paying it out as the barrel rotates. When the hoop-clamp passes the hoop-presser, if it were not already beyond it when the end of the hoop was inserted in the clamp, the lip $y'$ will impinge against cam $x'$ and move the hoop-presser outward far enough to permit the clamp to pass, and the hoop-presser will normally fly inward against the barrel or against the hoop, if the same be held in alinement therewith, and keep the hoop pressed against the barrel, and thereby assist in winding it tightly. It is not essential, however, that the hoop-presser bear upon the hoop during the winding action, as the operator can hold it tightly enough against the barrel without assistance. When the barrel has made a complete or nearly a complete turn, the operator inserts the free portion of the hoop up between cam $m'$ and arm $k'$ and sees that the extreme end of the hoop is placed under the hoop-presser, by which it is held in place upon the inner part of the hoop, the operator bringing the turn-table to a standstill just as the end of the hoop reaches the hoop-presser. Thus placing the tail end of the hoop up back of the cam $m'$ will of course cause a slight bulging of the hoop at that point, but said cam $m'$ will not be thick enough to make the bulge sufficiently large to be of serious consequence. The clencher-plate is provided with a shoulder $o^{10}$ on its outer face in such position with relation to the clamp that the overlapped parts of the hoop may bear up against it and be thereby held in proper position with reference to the nailing mechanism. This shoulder also serves as a guide in winding the hoop. The attendant, holding the free end of the hoop and controlling the movement of the turn-table through the medium of the foot-lever $k$, simply needs to see that the overlapped portions of the hoop lie upon the clencher-plate when the winding is completed, this being an easy matter, as the clencher-plate and hoop-presser are stationary. After the overlapped ends of the hoop are nailed together the hoop can be readily discharged from the clamp and hoop-presser by forcing it downward, this being done by the hoop-drivers $c^7 d^7$, hereinafter described. As will be observed, the clencher and hoop-presser are adapted to move upward and downward with the nail-carrier. The object of this is to enable the parts to be raised sufficiently to apply the end hoops.

Attached to the nail-carriage $p'$ by means of rods $a^2$ is a cam-rail $b^2$, curved to correspond to the circular path of the hoop-clamp and supported at a suitable point below the same just outside of the socket $h'$ and near its upper end, this cam inclining upward in the direction of rotation of the turn-table. Adapted to travel on this cam is a roller $c^2$, carried by the bent arm $k'$. This cam is supported in such relation to said roller $c^2$ that in applying the bilge-hoop said roller simply passes over said cam without being elevated thereby; but when the nail-carriage $p'$ is elevated (in the manner hereinafter set forth) to apply the end hoops or a higher bilge-hoop this cam-rail will be correspondingly elevated, so that as the table rotates the roller $c^2$ will travel up the cam and elevate the hoop-clamp to its proper position with respect to the clencher and hoop-presser, the sliding connection between arm $k'$ and its supporting-socket $h'$ permitting this movement and lug $i'$ preventing any swerving of the clamp. When the roller $c^2$ is off the cam-rail, the tendency of arm $k'$ is to rest normally on the end of the socket $h'$, and thus bring the hoop-clamp out of alinement with the hoop-presser and the clencher; but this tendency will not in practice interfere with the proper winding of the hoop, as the friction of the hoop against the barrel or clencher, if the operator hold the hoop tightly against the same, will prevent any material drop of the hoop-clamp;

but even if there be a slight fall of the hoop-carrier the rail $b^2$ is of such length as to bring the hoop-clamp up in time to insure the proper alinement of the overlapped ends of the hoop. A portion of the upper end of rail $b^2$ is horizontal, so that during the latter part of the winding operation the hoop-clamp will move horizontally in exact alinement with the clencher and hoop-presser.

The inward inclination of the lower section $h'$ of the hoop-winder corresponds approximately to the taper of the barrel, so that when the hoop-winder is vertically extended to wind the end hoops the hoop-clamp will be moved inward close to the form $a^3$, on which the end hoops are wound, and in order that the clencher-plate shall be correspondingly adjusted inward its supporting-arms $d^2$ engage inclined uprights $e^2$, supported on the adjacent posts $f^2$ of the main frame, as more fully hereinafter set forth. The hoop-presser being resiliently pressed outward will normally press against the former $a^3$ when said former is lowered upon the end of the barrel.

*Nailing mechanism.*—This part of the machine is specifically illustrated on Sheets 4 to 9, inclusive. Broadly speaking, this mechanism comprises a carriage made adjustable on its support, so that it may be raised and lowered to bring the devices to the proper point with respect to the barrel, and a supplemental carriage supported by the main carriage and adapted to be slid inward close to the overlapped ends of the hoop at the moment of driving the nails, and suitable nail-feeding and driving devices, as more fully hereinafter set forth.

The main carriage $p'$ is comprised of two side plates $g^2$, (shown in detail in Fig. 13,) being connected by rigid horizontal plates $h^2$ and $i^2$. Each side plate $g^2$ has an outward-extending bracket $j^2$ near its lower end and an inward-extending bracket $k^2$ at its inner edge, and the lower plate $h^2$ is bolted rigidly to these brackets, as shown most clearly in Fig. 14. It is on a lateral extension of the inner end of this plate $h^2$ that the tube $s'$ of the hoop-presser is formed.

The upper plate $i^2$ is supported rigidly on lugs $l^2$ and on inward-extending brackets $m^2$. The side plates $g^2$ are vertically grooved to fit suitable vertical ways on the frame-posts $f^2$, so that the carriage may slide vertically on the posts. The carriage is secured removably to the posts by means of plates $n^2$, bolted to the side plates of the carriage and extending outward over the side edges of the guideways on the posts.

The drive-shaft $o^2$ is provided with a drive-pulley $p^2$ and a clutch $q^2$, which latter is thrown into and out of gear by means of a lever $r^2$, connected by a rod $s^2$ to a vertical hand-lever $t^2$, pivoted on the outside of one of the posts $f^2$ and extending upward to near the base-plate $h^2$ of the carriage. Pivoted on the upper end of lever $t^2$ is a pawl or latch lever $u^2$, one arm of which extends upward alongside the upper or handle end of lever $t^2$ and the other arm of which extends inward under a slidable rod $v^2$, mounted in bearings $w^2$ on the posts $f^2$, said rod lying parallel to the base-plate of the carriage and being provided with a notch $x^2$ on its under side at a point between said bearings $w^2$. The inward-extending arm of pawl $u^2$ normally remains out of engagement with notch $x^2$; but when the operator grasps the handle of $t^2$ and the upper arm of pawl $u^2$ the inward-extending arm of lever $u^2$ is raised and held against the under side of rod $v^2$, and by moving said lever $t^2$ on its pivot said inward-extending arm may be made to engage in notch $x^2$, locking the rod to said lever and enabling it to be shifted back and forth with the lever. It will also be observed that by shifting lever $t^2$ inward—*i. e.*, toward the barrel-support—the clutch $q^2$ will be thrown into engagement and by shifting it away from the barrel-support the clutch will be disengaged.

The drive-shaft $o^2$ carries a bevel-pinion $y^2$, which meshes with a bevel-gear $z^2$, supported slidingly upon a vertical shaft $a^3$, journaled in bearings $b^3$, bolted one to the main frame and the other to the main carriage, said shaft $a^3$ extending up through an opening in the outer end of the base-plate $h^2$ and having secured to its upper extremity a bevel-gear $c^3$, meshing with a bevel-gear $d^3$ on a short shaft $e^3$, journaled in a bearing $f^3$, mounted on the upper plate $i^2$. The gear $z^2$ is supported entirely on pinion $y^2$, and shaft $a^3$ is slidable through it by reason of a spline-and-feather connection therewith. The shaft $a^3$ is vertically slidable in the lower one of its bearings $b^3$, this lower bearing being secured to the adjacent post $f^2$ of the frame. The upper bearing $b^3$ is rigidly connected to the outer edge of plate $i^2$ and is therefore movable vertically with the carriage. It will therefore be observed that the shaft $a^3$ moves vertically with the carriage, but does not carry with it the gear $z^2$, this gear being allowed to rest in engagement with pinion $y^2$.

To the inner end of shaft $e^3$ is secured the closed end of a cylinder $g^3$, whose inner open end fits within a flanged head-plate $h^3$, bolted rigidly to the plate $i^2$ of the carriage. The nails are fed into cylinder $g^3$ through an opening in the head $h^3$ by means of a hopper $i^3$, and the nails are fed out of this cylinder by means of grooved rails or troughs $j^3$, supported upon head $h^3$ and extending outward through openings in the same at a point below the hopper, these troughs $j^3$ inclining downward toward their discharge ends. There are four of these troughs or channels shown; but it is evident that a greater or less number may be employed, if desired. A guard-plate $k^3$ is secured to the inner side of head-plate $h^3$ and grooved to fit down over the channels $j^3$, whereby the nails as they are fed into the cylinder through hopper $i^3$ will be prevented from falling directly into said channels, and thereby clogging them. The nails are delivered into these channels by the rotation of cylinder $g^3$, the speed of this cylinder being just sufficient to carry the nails around by centrifugal force and drop them into the channels. Only a few of the nails carried up and dropped fall into the channels; but enough fall into them to keep them full. The channels are of a width and depth to receive the body of the nail and suspend it within the channel by its head, as shown in Fig. 17. As the nails drop into the channels they will be fed downward and outward by gravity, the jar of the machinery being sufficient to insure the nails sliding down the channels. The upper edges of the lower ends of the channel are stepped at $l^3$, so that each channel will discharge its nails one by one, the steps being only of sufficient width to receive one nail at a time.

The lower ends of the channels $j^3$ terminate, respectively, adjacent to the open ends of vertical slots $m^3$, formed in a block $n^3$, supported upon a rigid bracket-plate $o^3$, bolted to the face of the head $h^3$ below the ends of the channels $j^3$. The slots $m^3$ form, in effect, continuations of the channels, and at their inner ends they are enlarged to permit the heads of the nails to pass, so that when the nails reach the enlarged ends of the slots they drop vertically therethrough. The lower end of each channel is provided with a lip $p^3$, which forms one of the steps $l^3$ and extends out over the upper edge of block $n^3$ in order to carry the nails to or nearly to the enlarged portions of slots $m^3$ before discharging them. As the nails drop through the enlarged ends of slots $m^3$ they fall into flanged notches $q^3$, formed in the outer edge of plate $o^3$, these notches being approximately of the form of a dovetail and being adapted to let the body portions of the nails pass through them, but to catch and suspend the nails by their heads. Supported below plate $o^2$ upon rods $r^3$, projecting from head-plate $h^3$, is a sliding block $s^3$, which is provided with an upward-extending flange $t^3$, fitting against the outer edge of plate $o^3$ and closing the notches $q^3$. Coincident with notches $q^3$ the block $s^3$ is provided with vertical holes $u^3$, through which the nails may drop vertically into the delivery-tubes $v^3$, hereinafter described. Upon the upper face of slide-block $s^3$ is formed a series of ribs $w^3$, which work in grooves in the bottom of plate $o^3$, these grooves being coincident with notches $q^3$, whereby when block $s^3$ is slid outward on its rods $r^3$ these ribs will push the nails out of the notches and permit them to fall through passages $u^3$ into the tubes $v^3$, the flange $t^3$ moving away from the notches as the block moves, and thereby opening the notches sufficiently to permit the nails to be pushed out of them. It will be observed that the nails remain upright while passing through the channels $j^3$, block $n^3$, plate $o^3$, and slide $s^3$, so that if the block $n^3$ be deep enough the nails will rest end on end in the enlarged passages through said block; but I prefer that block $n^3$ be just deep enough to receive one nail at a time. It will also be observed that there can be no clogging of nails in the passages, as the nails can only feed one by one from each channel, the nail or nails in passages in block $n^3$ preventing others being delivered from channels, as shown. With each reciprocation of slide-block $s^3$ four nails will be discharged into the delivery-tubes below, and no additional nails can drop into notches $q^3$ until said slide is pushed back.

The slide $s^3$ is operated by the depending side arms $x^3$ of a yoke $y^3$, these depending arms being pivoted to brackets $z^3$, bolted to head $h^3$ upon opposite sides of the channels $j^3$, the bar connecting these depending arms lying across the head $h^3$ at a suitable point below the hopper $i^3$ and being normally pressed outward away from head $h^3$ by means of a spring $a^4$, secured to the upper edge of said head $h^3$. The lower ends of arms $x^3$ pivotally engage over lugs $b^4$ on said slide $s^3$, so that the slide will be normally drawn in under plate $o^3$, but may be forced outward therefrom by pressing the upper end of yoke $y^3$ toward head $h^3$.

The yoke $y^3$ is tripped by means of a finger $c^4$, secured to the upper cross-bar $d^4$ of the supplemental carriage, the upper part of this carriage being steadied and guided by a pair of rods $e^4$, projecting from the side edges of the main carriage, said carriage consisting, essentially, of said bar $d^4$, vertical side bars $f^4$, and a base-plate $g^4$, the front edge of the base-plate being curved to correspond to the curvature of the clencher-plate, near the lower edge of which said curved front edge lies. This supplemental carriage is supported by said rods $e^4$ and by another pair of longer rods $h^4$, which extend outward between the two posts $f^2$ and are connected rigidly together at their outer extremities by means of a transverse bar $i^4$, one end of which extends outward laterally and carries at its extended end a depending rod $j^4$, the lower end of which is braced to the adjacent rod $h^4$ by means of an inclined brace $k^4$. This rod $j^4$ passes loosely through a hole in the outer end of rod $v^2$, this sliding connection permitting rod $j^4$ and its attached parts to move vertically without disturbing the adjustment of rod $v^2$, but at the same time preventing one being adjusted horizontally without a corresponding movement of the other. It will thus be observed that by adjusting rod $v^2$ endwise in its bearing the frames $h^4$ may be adjusted forward or backward and that the main carriage may be vertically adjusted without disturbing the connection between the adjusting-rod $v^2$ and said supplemental carriage-frame.

The rods $h^4$ rest and work in long grooves in the upper face of a hammer-plate $l^4$, (shown in detail in Fig. 15$^a$,) which is supported slidingly upon base-plate $h^2$, being guided thereon by lateral lugs $m^4$, working in slots in side brackets $j^2$, and by a bolt $n^4$, depending from its forward end and working in a slot in the base-plate $h^2$. Secured across the inward or forward end of this hammer-plate is a bar $o^4$, which confines rods $h^4$ in their grooves. This hammer frame or plate is centrally slotted for the passage of shaft $a^3$ and the reception of its actuating-spring $p^4$, which bears against a lug $q^4$ at one end (said lug being formed on the base-plate $h^2$) and against the inner end of the slot, thereby normally pressing the hammer-plate inward toward the supplemental carriage. A roller $r^4$ is journaled upon the hammer-plate at its outer end, and adapted to contact with said roller is a cam $s^4$, arranged horizontally upon shaft $a^3$, so that upon the rotation of said shaft the cam will engage roller $r^4$ and force out the hammer $l^4$. To hold the hammer out when it is pressed out by said cam, a spring-actuated pawl $t^4$ is pivoted on one of the brackets $j^2$ and normally held up in the path of the extended end of one of lugs $m^4$, the lower side of this lug being beveled to facilitate its passage over the pawl on the outward movement of the hammer. The pawl is disengaged from lug $m^4$ at the proper moment by the hand of the attendant, a lever $u^4$, pivoted on one of the posts $f^2$ and connected to said pawl by a link $v^4$, being employed to facilitate the operation of the pawl. When the hammer is locked by the pawl in the outer extremity of its movement, the cam $s^4$ may rotate without coming in contact with the roller $r^4$.

Pivoted upon the upper side of plate $g^4$ is a pair of hammer-levers $w^4$, which extend inward toward each other and lie in the path of the hammer $l^4$, so that said hammer when released strikes against the outer curved edges of these levers and forces their inner ends inward toward the clencher-plate $o'$. Each hammer-lever $w^4$ is adapted to strike two nail-driving pins $x^4$, each of which works in a block $y^4$, secured rigidly to base-plate $g^4$. These four blocks $y^4$ are arranged in the arc of a circle conforming to the curvature of the clencher-plate and the front edge of plate $g^4$, the forward ends of these blocks projecting beyond said curved edge of plate $g^4$, so that when the supplemental carriage is adjusted inward as far as it will go the forward ends of said blocks $y^4$ bear directly against the overlapped ends of the hoop. Connected to each block $y^4$ is one of the delivery-tubes $v^3$, these tubes being curved upward and having their upper open ends clamped to a bar $z^4$, secured across standards $f^4$ at such a height that when the supplemental frame is at the outer extremity of its movement the upper open ends of the tubes will register with the passages $u^3$ of the nail-feeding devices. The lower ends of tubes $v^3$ are secured to the blocks $y^4$ by clamps $a^5$, and each tube discharges its nails into an open recess $b^5$ in its block, this recess communicating with a passage $c^5$, through which the driving-pin $x^4$ works, so that upon each forward movement of the driving-pin the nail which has been dropped into said passage $c^5$ (and in which it lies in a horizontal position) will be driven forward out of passage $c^5$ into the overlapped ends of the hoop and clenched by plate $o'$. Each driving-pin $x^4$ is normally retracted by a suitable coil-spring $d^5$, confined on the pin between its headed outer end and the bottom of a recess formed in the outer end of the block $y^4$. These springs $d^5$ keep the pins pressed normally against the hammer-levers and the hammer-levers normally against lugs $e^5$ on the plate $g^4$.

It will be observed that the clencher-plate is provided with a pair of outward-extending rods $f^5$, which work in open-ended tubes $g^5$, projecting forward from lugs $h^5$ on the side plates of the carriage, coil-springs $i^5$ being confined in said tubes $g^5$ to keep the clencher-plate normally pressed inward or forward. To limit the inward movement of the clencher-plate, its hereinbefore-described side arms $d^2$ are hooked at their outer ends and engage over the before-described guide-bars $e^2$, these bars $e^2$ being secured to the posts $f^2$ and inclined upward and inward, for the purpose hereinbefore set forth.

To vertically adjust the carriage, rack $j^5$ is attached to one of the flanges $n^2$ of the carriage, and engaging in this rack is a toothed segment $k^5$, secured to a short rock-shaft $l^5$, journaled in a bracket $m^5$, bolted to the outer edge of one of the posts $f^2$, said shaft $l^5$ having secured to it an operating-lever $n^5$, carrying a pawl adapted to engage a ratchet-segment $o^5$, rigidly bolted to one side of the bearing $m^5$. By these devices the carriage may be vertically adjusted and locked in its adjusted position.

*Operation of nailing mechanism.*—A quantity of nails having been placed in cylinder $b^3$, the operator throws lever $t^2$ to the right, thereby rotating shaft $a^3$ and the nail-cylinder, causing the nails to be fed to the delivery devices in the manner described. The rotation of shaft $a^3$ causes cam $s^4$ to force back the hammer, which is locked in its outer position by pawl $t^4$. The supplemental carriage is now relieved of the pressure of the hammer, and it may be slid back under the nail-delivery devices, the act of drawing it back tripping yoke $y^3$ and delivering one nail into each of the tubes $v^3$, from which they pass into the nail-holders $y^4$. Then when the hoop is completely wound around the barrel the operator throws the carriage forward against the overlapped parts of the hoop and then trips pawl $t^4$ and releases the hammer, whereupon the hammer moves forcibly inward and drives the nails. If additional blows are necessary to completely drive and clench the nails, the operator holds pawl $p^4$ down, whereby the cam $s^4$ will again bring back the hammer for another blow, said cam being straight on one side, so that the roller $r^4$ may move inward as soon as the point of the cam is passed. It is obvious that during the winding of the hoop the supplemental carriage, being free of the pressure of the hammer-spring, may be adjusted back out of the path of the hoop-carrier. It will be observed that whenever the supplemental carriage is moved inward against the hoop the nail-feeding cylinder will be operated, thus insuring a constant supply of nails to the channels $j^3$; but it is obvious that by reason of the fact that lever $t^2$ may be moved independently of rod $v^2$ of the carriage the nail-feeding cylinder may be kept in operation the entire time during which the hoop is being wound, if desired. In fact, the only time the nail-cylinder is necessarily stopped is when lever $t^2$ is swung outward to bring the supplemental carriage under the delivery devices.

The shield $k^3$, in addition to being grooved or notched on its under side for the reception of the nail-channels, is grooved coincidently with the channels down which the nails slide, as shown clearly in Fig. 21, whereby the heads of the nails may pass freely under the shield. This shield, besides preventing the nails fed through the hopper from engorging the channels, also prevents the nails that drop from the rotating cylinder interfering with the nails that are already placed in the channels and are in the act of passing out through head $h^3$.

*Hoop-driving and heading devices.*—These devices are supported directly over the barrel, and they consist, briefly speaking, of a series of pendent arms adapted when moved downward to jam or drive the hoops into place, first shoving them out of the hoop-carrier clamp, and to remove the truss-hoop upon their return movement, and the heading devices consist of a vertically-movable head holder or receiver, under control of the operator, and a reciprocating head-setter adapted to jam the head into the croze of the barrel, this head-setter carrying an upward-tapering form upon which the end hoops are wound preparatory to their being jammed off onto the end of the barrel, as more fully hereinafter set forth.

The head-receiver consists of a ring $p^5$, somewhat larger than the end of the barrel and supported centrally over the same by means of a yoke $q^5$, depending rigidly from a central rod $r^5$, which is supported from the upper end of the machine by a lever $s^5$, pivotally mounted on top of the machine and bifurcated at its inner end to embrace the upper end of said rod, rollers $t^5$ being journaled on the rod above and below the bifurcated ends of the lever, so that the lever has sliding connection with the rod and at the same time supports it. This lever is operated by a hand-lever $u^5$, secured to a transverse rock-shaft $v^5$, journaled in the lower part of the frame and provided with a lateral arm $w^5$, connected to the outer end of said lever $s^5$ by a long vertical rod $x^5$. A stationary segment $y^5$, in connection with a suitable pawl on lever $u^5$, holds the lever and connected parts in their adjusted positions. The ring $p^5$ is provided with a series of spring fingers or plates $z^5$, which depend from the inner side of the ring and incline inward sufficiently to rest on the chamfer of the barrel when the head is lowered, exterior stops $a^6$ being secured to two or more of the plates to rest upon the upper edge of the barrel and prevent the fingers entering too far. The rod $r^5$ slides through an opening in the upper beam $b^6$ of the frame and is guided in its vertical movements by a sleeve or tube $c^6$, secured to said beam. Depending from the upper end of rod $r^5$ through an opening in beam $b^6$ is a long finger $d^6$, having its lower extremity bent laterally to form a hook $e^6$.

Mounted to slide on rod $r^5$ and upon vertical rods $f^6$ is a circular plate or head $g^6$, provided with an upward-extending guide-tube $h^6$, surrounding said rod $r^5$. This head is provided with two radial oppositely-extending arms $i^6$, whose outer ends embrace and slide upon said rods $f^6$, these rods being supported stationarily on the frame upon opposite sides of said head $g^6$. Connected pivotally to the upper side of head $g^6$ is a pitman $j^6$, whose upper end is connected to a crank-arm $k^6$, secured to the inner end of a shaft $l^6$, this shaft carrying a large spur-gear $m^6$, meshing with a pinion $n^6$, secured on a shaft $o^6$, journaled in the frame below gear $m^6$. On the outer end of shaft $o^6$ is secured a large spur-gear $p^6$, which meshes with a pinion $q^6$, secured to the drive-shaft $r^6$, this drive-shaft carrying two loose band-pulleys $s^6$ $t^6$, which in practice will be belted to run in opposite directions. Between these pulleys is a double clutch $u^6$, which rotates with the shaft, as usual, and is adapted to be shifted endwise thereon to lock one or the other of the pulleys to the shaft. The clutch-shifter consists of the usual bifurcated arm $v^6$, slidingly supported on a rod $w^6$, mounted stationarily in bearings on the posts $f^2$ and extending across the machine at a point a little above the band-wheels. This arm $v^6$ is connected by a rod $x^6$ to a sleeve $y^6$, slidingly mounted on said rod $w^6$ and provided at its outer end with an upward inward extending arm $z^6$, the upper end of which lies adjacent to the inner face of large gear $m^6$ and is adapted to be struck and shoved inward by a beveled lug $a^7$, carried by said gear $m^6$. At the inner end of sleeve $y^6$ is formed a vertical cam-plate $b^7$, for the purpose hereinafter set forth.

Depending from head $g^6$ are the four hoop-driving arms $c^7$ and $d^7$, the three arms $c^7$ being constructed alike and the fourth arm $d^7$ having a special construction. The lower portions of all the drivers curve inward slightly and are provided on their inner sides, near their lower ends, each with an inward-extending shoulder $e^7$, adapted to engage the upper edge of the hoop while the same is being forced down on the barrel, the end of each driver beyond its lug being beveled or curved outward, so as to slide down over the exterior of the hoop and insure the lugs $e^7$ an accurate engagement with the hoop. All the lugs $e^7$ are square on their under sides; but only two of them have their upper sides straight or square, these two being diametrically opposite each other, the upper edges of the other two lugs being beveled off upon their upper sides. The object of this is to insure at least two of the lugs engaging under the truss-hoop upon the upward movement of the drivers, and thereby lift said hoop (which has been loosened by the driving down of the bilge-hoop) off the barrel. The three drivers $c^7$ are pivotally swung upon tangential bolts $f^7$, supported in radial lugs on the edge of head $g^6$, so that said drivers have a free radial swing and will rest normally against the exterior of the barrel as they move downward upon the same. The drivers $e^7$ are preferably slotted vertically where pins $f^7$ pass through them, so that they have a slight bodily movement vertically. The four drivers are arranged at equidistant points around the head. The driver $d^7$ is provided with a handle $h^7$, projecting outward about midway its length, and near the head $g^6$ it is loosely jointed by a pin $i^7$, arranged tangentially to the head, so that this driver $d^7$ may also have a free swing radially. The upper section $j^7$ of driver $d^7$ is inclosed in a box $k^7$, consisting of a pair of plates bolted together and separated by a flange $l^7$, formed on the lower edge of one of the plates. The part $j^7$ is provided with oppositely-extending lugs $m^7$ at its upper end, which work in vertical slots in the side plates of the box, thereby providing for a limited bodily movement of driver $d^7$. The driver $d^7$ is suspended on the lugs $m^7$, and its upper beveled end is normally in contact with the inner lower end of a trip-lever $n^7$, pivoted between the box-plates and having its upper end bent laterally outward away from head $g^6$ and adapted to strike the inner face of cam $b^7$ at predetermined times. Extending upward from the inner edge of box $k^7$ is an arm $o^7$, to which is connected by a strong coil-spring $p^7$ the upper end of lever $n^7$, this spring serving to draw the upper end of said lever normally inward and keep its lower end pressed down upon the upper end of part $j^7$. The box $k^7$ is provided with the lateral lug $q^7$, which is pivoted to the edge of head $g^6$ by a radial bolt $r^7$, whereby the box is free to swing on said pivot-bolt $r^7$ and enable the driver $d^7$ to be swung out tangentially to the head as well as radially. The box is limited in its pivotal movements on bolt $r^7$ by means of lugs $s^7$ $t^7$, adapted to abut, respectively, against the under side and upper side of head $g^6$.

The upper end of arm $o^7$ is connected by a link $u^7$ to the outer end of a lever $v^7$, which is pivoted to swing horizontally upon a lug formed on guide-tube $h^6$ a short distance above head $g^6$, said lever $v^7$ being provided with arms $w^7$, embracing said tube $h^6$ and pivotally connected by tangentially-arranged links $x^7$ to the upper ends of drivers $e^7$. It will thus be observed that when driver $d^7$ is swung out tangentially the other three drivers will be swung out radially, by means of the parts connecting arm $o^7$, to the upper ends of said other drivers, the endwise pressure on link $u^7$ and the resulting pivotal movement of lever $v^7$ serving to draw in the upper ends of said drivers $e^7$ and swing out their lower ends. At the same time driver $d^7$ is thus moved tangentially it may be swung out radially on pivot $i^7$.

Mounted slidingly on rod $r^5$ above guide-tube $h^6$ is a cross-head $y^7$, whose ends are connected by a pair of rigid vertical rods $z^7$ to a hoop-form $a^8$, said rods passing down through openings in head $g^6$ and yoke $q^5$ and being rigidly secured to the circular bottom plate of said form, this bottom plate lying between the vertical arms of said yoke and underneath its top bar. Secured adjustably to the bottom of form $a^8$ is a head-setting plate $b^8$, which is circular in form and adapted to pass within the upper end of the barrel, while the lower end of the form $a^8$ is approximately equal in diameter to the upper end of the barrel and is adapted to rest thereon. The head-setter $b^8$ is adjustably connected to the bottom of the form by short screws $c^8$. At diametrically opposite points the hoop-former (which is simply a short hollow cylinder tapering toward its upper open end) is vertically slotted, as at $d^8$, for the passage of the top bar of yoke $q^5$, it being essential at certain times that the hoop-former be brought up with its bottom plate against said top bar. Pivotally mounted upon a pin $e^8$, projecting from the hub of said cross-head $y^7$, is a gravitating latch-hook $f^8$, which is adapted to engage in a notch formed in one edge of a latch-rod $g^8$, extending upward from the upper end of sleeve $h^6$, the end of this latch-rod beyond the notch being beveled, so as to automatically engage hook $f^8$ upon its upward movement should said hook be swinging freely from its pin $e^8$. Hook $f^8$ is provided with an upward-extending inclined cam or lip $h^8$, which is adapted to be engaged by hooked end $e^6$ of finger $d^6$ and disengage said hook from latch $d^8$ and hold it out of engagement.

*Operation of hoop-driver and head-setter.*— During the winding and nailing of the bilge-hoop these devices are out of operation except the oppositely-rotating pulleys $s^6$ $t^6$, the double clutch member therebetween lying at a point intermediate the pulleys. The parts are shown in this position in Fig. 1, except that the head receiver or basket is lowered upon the barrel. When the parts are thus out of use, the crank $k^6$ is at the highest point of its movement, on dead-center, the latch $f^8$ is in engagement with catch $g^8$, the sleeve $y^6$ is adjusted so that its cam-arms $z^6$ $b^7$ are out of alinement with end of lever $n^7$ and lug $a^7$, and the head receiver or basket is elevated to the limit of its upward movement. (Shown in Figs. 35 and 38.) Now assuming that the bilge-hoop has been wound and nailed the operator throws the clutch-shifter $y^6$, by means of its handle $i^3$, inward, (to the left in Fig. 1,) thereby throwing the clutch into engagement with pulley $s^6$ and causing shaft $l^6$ to rotate in the direction of the arrow shown in dotted lines in Fig. 1, causing the pitman to descend, and with it the head $g^6$ and head-setter and hoop-former, latch $f^8$ being in engagement with catch $g^8$, the head-receiver remaining in its elevated position. As the parts thus put in motion are descending slowly the attendant grasps handle $h^7$ and swings driver $d^7$ outward radially and tangentially, thereby spreading the drivers, so that they will pass down upon the barrel without engagement with the iron truss-hoop $j^8$ thereon. When the lugs $e^7$ on the drivers have passed said hoop, the drivers are released and allowed to run down on the exterior of the barrel, the lugs $e^7$ bringing up on the upper edge of the hoop while it is held in the hoop-carrier (if it has not been previously dislodged therefrom by an attendant) and forcing the same down on the bilge of the barrel with a slow jamming action. When the hoop-form reaches the upper end or nearly to the upper end of the barrel, it is automatically disengaged from the descending parts by the hook $e^6$, which engages cam $h^8$ and disengages the latch-hook $f^8$, the finger $d^6$ being of such length that when the head-receiver is adjusted to the upper limit of its movement the hook $e^6$ will engage cam $h^8$ and withdraw and hold it out of engagement with latch $g^8$ when the hoop-form reaches the upper end of the barrel, allowing said hoop-form and its attached parts to rest normally upon the end of the barrel. As the jamming action increases the upward pressure bodily lifts the three drivers $e^7$ (if they be slotted, as shown) until they bring up on pins $f^7$. Then as the drivers go down and the pressure increases the driver $d^7$ begins to yield vertically against the action of spring $p^7$ until the hoop is jammed home, at which time the upward pressure on this driver will be sufficient (the tension of the spring $p^7$ having been previously regulated) to force trip-lever $n^7$ outward against cam $b^7$, (this cam $b^7$ having been shifted over by the operator in starting the driving devices,) thereby shifting the clutch into engagement with the outer pulley $t^6$. Thus shifting the clutch into engagement with the pulley $t^6$ reverses the train of gearing and raises pitman $j^6$ before it has completed its downward stroke. The three drivers $e^7$ are slotted where their pivotal pins pass through them simply in order that they may adjust themselves to the work. It is therefore believed not to be absolutely essential that they be slotted and that the only one of the drivers that need have a bodily vertical movement on its support is the jointed driver $d^7$. As the drivers ascend they pick up the iron hoop $j^8$ (which has been loosened by the jamming down of the bilge-hoop) and carry it above the end of the barrel, when it may be removed by an attendant by first spreading the devices. After this hoop is removed and while the drivers are ascending the head-receiver is quickly brought down to position on the barrel, the attendant having spread the drivers sufficiently to permit the ring $p^5$ of the receiver to pass lugs $e^7$ when he removed iron hoop $j^8$. As the head-receiver is lowered hook $e^6$ releases latch $f^8$ and allows it to swing into the path of the ascending latch $g^8$. Then as said latch $g^8$ ascends its beveled nose causes hook $f^8$ to engage in the notch of said catch $g^8$, thereby locking the hoop-form and head-setter to the ascending driver-frame. When these ascending parts have reached the upper limit of the stroke of the pitman $j^6$, the beveled lug $a^7$ will impinge against arm $z^6$ of the belt-shifter (which has been previously shifted over into alinement with said lug by trip-lever $n^7$) and throw the clutch out of engagement with pulley $t^6$, moving the clutch to a point intermediate the two pulleys, and thereby stopping the mechanism. It will thus be seen that pitman $j^6$ is never allowed to make a complete stroke, although it may without injury be permitted to complete its stroke, provided the operator spreads the drivers so that they shall pass the driven hoop on their way down and up. It will be observed also that the spring-fingers $z^5$ of the head-receiver yield in passing the hoop-form going down and coming up; but when the head-receiver passes the lower ends of the drivers the drivers must be spread. It will also be observed that the drivers are sufficiently far apart to prevent any interference with the clencher-plate $o'$. The head-receiver having been brought down upon the barrel and the other parts brought to rest in their upper positions, an attendant places the barrel-head in the receiver, as shown in Fig. 37, and then shifts the clutch into engagement with pulley $s^6$, as before, thereby bringing down the driver-carriage and attached parts. As the drivers descend the attendant spreads them, as before, so that they may pass the ring $p^5$ and go down upon the barrel. As the head-setter $b^8$ passes down into the barrel it forces the head off the spring-fingers $z^5$ and into the croze, the fingers and the staves yielding outwardly sufficiently to permit this. Now the very instant the head slips off the fingers the operator quickly elevates the head-receiver by means of lever $u^5$, the thin fingers slipping out from between the chamfered edge of the barrel and the lower edge of the hoop-form just before said form reaches the end of the barrel. This withdrawal of the fingers from between the barrel and the descending hoop-form will not be difficult, owing to the slow movement of the descending parts. As the head-receiver ascends hook $e^6$ disengages latch $f^8$ from catch $g^8$, and thereby arrests the downward movement of the head-setter and hoop-form, allowing these parts to rest by gravity upon the end of the barrel. It will be observed that whenever the hoop-form rests upon the barrel and the head-receiver is at the upper limit of its stroke hook $e^6$ will hold the latch out of engagement and, in fact, out of the path-latch $g^8$, the cam $h^8$ on said latch never passing below hook $e^6$. After the hoop-former is thus brought to rest on the end of the barrel the drivers continue to descend alone until the operator reverses their movement by shifting the clutch, as before, or until they bring up on the previously-driven hoop and are thereby automatically reversed, as described. As the drivers ascend they do not take the hoop-former up with them this time by reason of the fact that latch $f^8$ is held out of the path of catch $g^8$, thereby leaving the hoop-former down upon the barrel with all the other parts elevated. The parts are now in position to wind the end hoops on the former, the nailer-carriage being elevated to bring the clencher-plate, hoop-presser, and nailing devices to the proper point on the hoop-former, this point being determined by the position the hoop is to occupy on the end of the barrel. The higher the hoop is wound on the tapering former the nearer the end of the barrel will it fit when jammed down on the barrel, as is evident. The hoop is wound and nailed on the former in the same manner as the bilge-hoop is wound and nailed on the barrel. After the hoop is nailed it is pushed down off the former onto the end of the barrel in the same manner as the bilge-hoop is pressed home, the automatic devices serving to return the drivers when a certain pressure is obtained. When the desired number of end hoops are thus applied, the heading and hooping operations for the upper end of the barrel are completed and the barrel is ready to be reversed, end for end, to have its other end worked in the same manner.

It will be observed that this invention is not confined to the specific construction shown and described, and I therefore reserve the right to vary the same without departing from the scope of the claims. It will be obvious, for instance, that by slight changes in the nail feeding, delivering, and holding devices staples may be driven into the hoops instead of nails. It will also be obvious that if "quarter" truss-hoops—i. e., hoops driven on the barrel between the points where bilge-hoop and end hoop are to be placed—are on the barrel when it comes to my machine such hoops may also be removed by the drivers; but in such instances the head and end hoops will be placed before removal of the quarter-hoop.

It will be observed that an essential feature lies in winding the hoops directly upon a cylindrical body or form in such position with respect to the barrel that they may be jammed out of the winding devices directly to place on the barrel, the hoop-form $a^8$ serving as the cylindrical body or form in winding the end hoops and the barrel itself serving as the form in winding the bilge-hoops. It will be further noted that an essential feature consists in making the form tapering and the hoop-winder adjustable with respect to the point of winding, so that a hoop of the size desired may be wound.

Having thus fully described my invention, what I claim, and desire to secure by Letters Patent, is—

1. In combination with a rotary table and means for rotating it, and means for holding the barrel upright on said table, said means comprising a series of clamps adapted to engage the inner edges of the staves of the barrel and another series of clamps adapted to grasp the barrel at a point above its lower end.

2. In combination, a rotary table and means for holding a barrel upright thereon, said means consisting of a series of clamps adapted to engage the inner chamfered edge of the barrel and another series of clamps adapted to grasp the barrel externally, and means whereby said two series of clamps may be adjusted simultaneously in the opposite direction.

3. In combination, a rotary table carrying means for clamping a barrel endwise thereon, said means consisting of a series of radially-slidable clamp-jaws adapted to engage the chamfer of the barrel, a series of radially-slidable jaws adapted to grasp the barrel externally at a point above its lower end, a central adjustable ring, oppositely-extending links connecting said ring to said two series of clamps, and means for rotatively adjusting said ring, whereby the clamps are radially moved simultaneously in opposite directions.

4. In combination a rotary table, a series of clamps thereon adapted to grasp the inner chamfered edge of the barrel, another series of clamps rising from the table and adapted to grasp the barrel at or near its middle, one or more of these latter clamps being jointed and adapted to be turned down to facilitate the placing of the barrel.

5. In combination, a rotary table, a series of upright clamps thereon adapted to grasp the barrel at or near its middle, one of said clamps being jointed and adapted to be turned down to one side, and another clamp having a shorter upright adapted to grasp the barrel at a point lower down than the aforesaid clamps, and means for centering the lower end of the barrel on the table.

6. In combination, a rotary table, means for centering the lower end of a barrel thereon, a series of upright clamps rising from said table and adapted to grasp the barrel at or near its middle, one of said uprights being jointed so as to adapt it to be turned down, a spring applied to this joint to normally return the upper section of the upright, for the purpose set forth.

7. In combination, a turn-table, means for centering a barrel thereon comprising a series of segments having radial grooves therebetween, a circular plate secured to said segments, an inner series of clamps and an outer series of clamps, both series of clamps working in said grooves, a central ring and means connecting it to said clamps to operate them simultaneously in opposite directions, and means for adjusting and holding said ring in its adjusted positions.

8. In combination, a turn-table carrying means for clamping a barrel upright thereon, a hoop-winder carried by said table outside of said clamping means and adapted to rotate with the table, for the purpose set forth.

9. In combination, a rotary table carrying means for clamping a barrel upright thereon, a hoop-winder adapted to rotate with said table, and a hoop-presser adapted to resiliently bear upon the hoop during the winding operation.

10. In combination, a turn-table and means for holding a barrel upright thereon, a hoop-winder adapted to rotate with the table and barrel, and a clencher-plate stationarily supported between the barrel and the circular path of the hoop-winder.

11. In combination, means for supporting and rotating a barrel, a hoop-clamp adapted to rotate with the barrel and support, a resilient hoop-presser adapted to bear upon the hoop as it is wound upon the barrel and lying in the path of the hoop-clamp, and means for automatically pressing back the hoop-presser to permit the passage of the hoop-clamp.

12. In combination, means for supporting and clamping and rotating a barrel, a clencher-plate supported stationarily with respect to the barrel and close to it, a hoop-winder adapted to rotate with the barrel and in the path outside of the clencher-plate, and a resilient hoop-presser adapted to bear upon the hoop at or near its overlapped ends, the hoop being adapted to be overlapped upon the clencher-plate.

13. In combination, means for supporting and rotating a barrel, a hoop-winder adapted to rotate with the barrel, said hoop-winder consisting of an upright arm carrying a clamp at its upper end, said clamp being open on its under side to permit the hoop end to be pressed downward out of the clamp.

14. In combination, means for supporting and rotating a barrel, a hoop-winder supported on the barrel-support and being vertically extensible, and a device, as a cam, supported adjacent the hoop-winder and adapted to vertically extend the same at a predetermined point in its rotation.

15. In combination, a barrel-support and means for rotating it, a vertically-extensible hoop-winder thereon, a carriage supported adjacent to said hoop and being vertically adjustable, a clencher-plate supported on said carriage and vertically movable with it, and a device for vertically extending the hoop-winder at the proper point to bring the overlapped ends of the hoop upon the clencher-plate.

16. In combination, a rotary barrel-support carrying a vertically-extensible hoop-winder, means for vertically extending said hoop-winder at a predetermined point in its rotation, a hoop-presser supported on a vertically-adjustable carriage, for the purpose set forth.

17. In combination, a rotary barrel-support carrying an extensible hoop-winder, a vertically-adjustable carriage carrying a clencher-plate, a hoop-presser and a device for vertically extending the hoop-winder so as to bring the overlapped ends of the hoops upon the clencher-plate.

18. In combination, a barrel-support and means for rotating it, a vertically-extensible hoop-winder on said support, a vertically-adjustable carriage carrying a cam-rail lying in the path of said winder and adapted to vertically extend said winder at a predetermined point in its rotation, and a clencher-plate vertically movable with said carriage and said cam-rail, for the purposes set forth.

19. In combination, a barrel-support carrying a vertically-extensible hoop-winder, means for vertically extending the hoop-winder, a carriage supporting a clencher-plate, vertical guide-bars engaging said clencher-frame and adapted to force it inward as the carriage and clencher are raised, and means whereby the hoop-winder is also forced inward correspondingly as it is extended, for the purpose set forth.

20. In combination, a table for supporting and rotating the barrel, an upright hoop-winder thereon carrying a cam, a hoop-presser supported in the path of said hoop-winder and provided with a cam-surface adapted to come in contact with the cam on the hoop-winder, for the purpose set forth.

21. In combination, a barrel-support carrying a hoop-winder, a hoop-presser supported in the path of the hoop-winder, a clencher-plate supported adjacent to the hoop-presser and between the path of the hoop-winder and the barrel-surface, and a nailing mechanism adapted to be brought up to the overlapped ends of the hoop after the passage of the hoop-winder.

22. In combination, a rotary barrel-support and hoop-winder, a clencher-plate stationarily supported between the barrel and the hoop-winder, whereby the ends of the hoop may be overlapped on said clencher-plate, and nailing mechanism adjacent to said clencher-plate.

23. In combination, a rotary barrel-support carrying a vertically-extensible hoop-winder, a vertically-adjustable carriage carrying nailing mechanism, a clencher-plate, a hoop-presser, and means for vertically extending the hoop-winder at the proper point.

24. In combination, a head-holder comprising a ring and depending thin spring-fingers inclining inward and adapted to fit against the chamfer of the barrel, substantially as set forth.

25. In combination, a barrel-support, a head-holder supported above said support, a head-setter working through said head-holder, and means for reciprocating said holder and head-setter independently of each other and also both together, for the purposes herein set forth.

26. In combination, a head-receiver adapted to fit within the end of the barrel and support a head, means for reciprocating this head-receiver, a hoop-former and means for reciprocating it through said head-receiver and independently thereof, and a head-setting plate secured to the under side of hoop-former, and means whereby the head-receiver may be raised and the hoop-former allowed to rest upon the barrel.

27. In combination, a hoop-former adapted to rest above the upper end of the barrel, said hoop-former being tapered upward, and mechanism whereby a hoop may be wound upon said former and nailed and jammed down on the end of the barrel.

28. In combination, an upward-inclined hoop-form adapted to rest on the end of the barrel, mechanism for winding a hoop thereon and nailing it, said mechanism being vertically adjustable with respect to the form, for the purpose set forth.

29. In combination, a form upon which the hoops are to be wound, this form being movably supported above the end of the barrel, and means whereby a hoop may be jammed off said form to its place on the barrel.

30. In combination, reciprocating means for jamming a hoop endwise on a barrel, and means when a predetermined pressure on the hoop is obtained for automatically reversing the movement of the hoop-driving means.

31. In combination, a series of hoop-drivers adapted to engage the hoop to be driven at different points, a support for said hoop-drivers, and devices connected to one of them for reversing the movement of the drivers when a predetermined pressure on the hoop is obtained.

32. In combination, a head-holder and means for reciprocating it, a depending hook, as $a^6$, carried thereby, a support and means for reciprocating it, this support carrying a catch, a reciprocating head-setter carrying a latch adapted to engage said catch and be disengaged therefrom at a predetermined point, substantially as set forth.

33. In combination, a head-holder and means for reciprocating it, a head-setter working through the head-holder, means for reciprocating the head-setter, and means operated by the return of the head-holder for disengaging the head-setter from its reciprocating means at a predetermined point in the working stroke of the head-setter.

34. In combination, hoop-drivers and means for reciprocating them, one of the drivers having a movement independent of the others, and means connected to the independently-movable one of the drivers for automatically reversing the drivers and releasing the driven hoop of pressure by the independent movement of said driver.

35. In combination, a reciprocating support, a series of drivers pivotally depending therefrom and adapted to be spread apart, one of the drivers having an additional movement tangentially, and means whereby this tangential movement is caused to spread the remaining drivers.

36. In combination, a support and means for reciprocating it, a series of drivers pivotally depending therefrom and adapted to be spread radially, one of the drivers having an additional pivotal movement tangentially with respect to the support, a pivoted lever and a series of links connecting this lever to the drivers above their pivotal points, for the purpose herein set forth.

37. In combination, a vertically-reciprocating support carrying pendent hoop-drivers, one of said drivers being adapted to rise automatically by pressure upon the hoop, a spring-actuated part adapted to be shifted by the rise of said driver, and means whereby the shifting of said part against the action of its spring reverses the movement of the hoop-drivers.

38. In combination, a reciprocating support carrying hoop-drivers, one of said drivers being pivotally jointed below said support, a pivotal box slidingly connected to the upper end of said jointed driver, a pivoted trip-lever carried by said box and a spring actuating the same, this lever being adapted to be moved against the action of its spring upon the rise of the jointed driver, and means whereby the movement of this trip-lever is caused to reverse the movement of the drivers.

39. In combination, a support and mechanism for reciprocating the same, hoop-drivers carried by this support, one of said drivers being bodily movable vertically, a pivotal box from which said jointed member is suspended, a spring-actuated trip-lever carried by said box and adapted to be actuated by the rise of said jointed driver, means whereby the movement of this trip-lever is caused to reverse the movement of the drivers, and means whereby the pivotal movement of said box is caused to radially spread the drivers, substantially as set forth.

40. In combination, a support carrying hoop-drivers, mechanism for reciprocating said support, said mechanism comprising a train of gearing, a crank-shaft and pitman, and a pair of pulleys adapted to be driven in opposite directions, a double clutch member between these pulleys and adapted to be engaged with one or the other or to lie midway between the same out of engagement, a movable part actuated by a predetermined pressure on the hook being driven, means whereby the movement of this part shifts the clutch member automatically from one pulley to the other to reverse the movement of the driver and means operated by the train of gearing for automatically shifting the clutch member to an intermediate point to stop their movement.

41. In combination, a support carrying means for driving the hoop, means for reciprocating said support, a reciprocating head-receiver, a reciprocating hoop-form carrying a head-setter, and devices whereby the hoop-form and head-setter and drivers may be reciprocated independently or together, for the purpose set forth.

42. In combination, hoop-driving means, a train of gearing for reciprocating the same, a pair of pulleys adapted to run in opposite directions and geared to said gearing, a double clutch for said pulleys, a slidable clutch-shifter, adapted to stop the train of gearing when slid in one direction and to reverse its movement when slid in the opposite direction, an automatic device for shifting said clutch-shifter in one direction, means operated by pressure on the hoop being driven for actuating said automatic device, and another device operated automatically by the train of gearing to throw the clutch-shifter in the opposite direction to stop the movement of the hoop-driving devices.

43. In combination, a reciprocating head-holder, a reciprocating hoop-driver, a reciprocating head-setter carrying a hoop-form, an automatic latch connection between the head-setter and the hoop-driver, whereby said hoop-driver and head-setter may reciprocate together and also independently, and a device carried by the head-holder and adapted to disengage said latch connection at a predetermined point in its movement, for the purpose set forth.

44. In combination, a reciprocating hoop-driver, a head-holder, a reciprocating head-setter carrying a hoop-form on which the hoops are to be first wound, a latch connection between the hoop-driver and head-setter, and a movable device adapted to disengage said latch connection at a predetermined point in the joint movement of the head-setter and hoop-driver, whereby the hoop-driver may continue to operate and the head-setter may rest against the end of the barrel upon which the hoops are to be placed.

45. In combination, mechanism for winding a hoop directly upon a barrel and overlapping its ends; mechanism for nailing said overlapped ends while the hoop is on the barrel, and a device for driving said hoop to its place on the barrel.

46. In combination, mechanism for winding a hoop directly upon a barrel and nailing its overlapped ends, and mechanism for discharging said hoop from the foregoing mechanism and simultaneously driving it home to its place on the barrel.

47. In a barrel-hooping machine, the combination of means for supporting a barrel, a hoop-form supported at one end of the barrel, means for winding the hoop upon this hoop-form and overlapping its ends so that it may be nailed, and means for driving the hoop off the hoop-form directly onto the barrel.

48. In a barrel-hooping machine, the combination of means for supporting a barrel, a hoop-form supported on one end of the barrel and concentric therewith, means for winding a hoop upon this hoop-form and overlapping its ends, means for nailing the overlapped ends of the hoop, and means for driving the hoop off the hoop-form directly onto the barrel.

49. In a barrel-hooping machine the combination of means for supporting the barrel, means for winding the hoop and overlapping its ends, so that the overlapped ends may be nailed, and mechanism for discharging the hoop from the winding means and simultaneously driving it to place on the barrel.

50. In a barrel-hooping machine, the combination of supporting the holding devices for the barrel, a rotary hoop-winder adapted to wind the hoop upon the barrel and overlap its ends, and devices for holding the overlapped ends while being nailed.

51. In a hoop-forming machine, the combination of a support, a cylindrical form supported thereon, a rotary hoop-winder adapted to wind a hoop thereon and overlap its ends, and a clencher-plate supported between the overlapped ends of the hoop and the form.

52. In combination, clamping and supporting devices for a barrel, means for rotating these devices, means for winding a hoop upon the barrel and overlapping its ends during the act of rotating the barrel, and means for holding the overlapped ends of the hoop during the nailing operation.

53. In a hoop-forming machine, the combination of a tapering cylindrical form upon which the hoop is to be directly wound, a support therefor, a rotary hoop-winder and means for rotating it, said hoop-winder being adjustable with respect to the point of winding.

54. In a barrel-hooping machine, the combination of a barrel-support, a tapering cylindrical hoop-form, a hoop-winder for winding and overlapping a hoop thereon, said hoop-winder being adjustable with respect to the point of winding, means for holding the overlapped parts of the hoop while being nailed, the completed hoop being supported in such relation to the barrel that it may be discharged from the hoop-winding devices onto the barrel.

In testimony whereof I hereunto affix my signature, in the presence of two witnesses, this 10th day of November, 1899.

JOHN BIRD.

Witnesses:
W. A. HOLMAN,
E. F. BERRY.